United States Patent
Matyjaszewski et al.

(10) Patent No.: US 7,157,530 B2
(45) Date of Patent: Jan. 2, 2007

(54) CATALYST SYSTEM FOR CONTROLLED POLYMERIZATION

(75) Inventors: Krzysztof Matyjaszewski, Pittsburgh, PA (US); Sung Chul Hong, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/860,807

(22) Filed: Jun. 3, 2004

(65) Prior Publication Data

US 2004/0220362 A1   Nov. 4, 2004

Related U.S. Application Data

(62) Division of application No. 09/972,056, filed on Oct. 5, 2001, now Pat. No. 6,790,919.

(60) Provisional application No. 60/238,812, filed on Oct. 6, 2000.

(51) Int. Cl.
C08F 2/06 (2006.01)
C08F 4/44 (2006.01)

(52) U.S. Cl. .............. 526/68; 526/69; 526/70; 526/127; 526/160; 526/172; 526/348.6; 502/152; 502/155; 502/167

(58) Field of Classification Search ............ 526/69, 526/171, 90, 127, 128, 172, 68, 70, 160, 526/348.6; 502/152, 155, 167
See application file for complete search history.

(56) References Cited

U.S. PATENT DOCUMENTS

| 3,183,217 | A | | 5/1965 | Semiuk et al. |
| 3,959,225 | A | | 5/1976 | Kuntz |
| 4,007,165 | A | | 2/1977 | MacLeay et al. |
| 4,374,751 | A | | 2/1983 | Dudgeon |
| 4,728,706 | A | | 3/1988 | Farnham et al. |
| 4,940,648 | A | | 7/1990 | Geiger |
| 4,954,416 | A | | 9/1990 | Wright et al. |
| 5,089,135 | A | | 2/1992 | Yoneyama et al. |
| 5,169,914 | A | | 12/1992 | Kaszas et al. |
| 5,312,871 | A | | 5/1994 | Mardare et al. |
| 5,405,913 | A | | 4/1995 | Harwood et al. |
| 5,451,647 | A | | 9/1995 | Faust et al. |
| 5,470,928 | A | | 11/1995 | Harwood et al. |
| 5,510,307 | A | | 4/1996 | Narayanan et al. |
| 5,705,577 | A | * | 1/1998 | Rossi et al. ............ 526/68 |
| 5,763,548 | A | | 6/1998 | Matyjaszewski et al. |
| 5,789,487 | A | | 8/1998 | Matyjaszewski et al. |
| 5,807,937 | A | | 9/1998 | Matyjaszewski et al. |
| 5,910,549 | A | | 6/1999 | Matyjaszewski et al. |
| 5,945,491 | A | | 8/1999 | Matyjaszewski et al. |
| 6,111,022 | A | | 8/2000 | Matyjaszewski et al. |
| 6,121,371 | A | | 9/2000 | Matyjaszewski et al. |
| 6,124,411 | A | | 9/2000 | Matyjaszewski et al. |
| 6,162,882 | A | | 12/2000 | Matyjaszewski et al. |
| 6,288,186 | B1 | | 9/2001 | Matyjaszewski et al. |
| 6,326,455 | B1 | * | 12/2001 | Vassiliou et al. ............ 528/272 |
| 6,407,187 | B1 | | 6/2002 | Matyjaszewski et al. |
| 6,512,060 | B1 | | 1/2003 | Matyjaszewski et al. |
| 6,538,091 | B1 | | 3/2003 | Matyjaszewski et al. |
| 6,624,262 | B1 | | 9/2003 | Matyjaszewski et al. |
| 6,624,263 | B1 | | 9/2003 | Matyjaszewski et al. |
| 6,627,314 | B1 | | 9/2003 | Matyjaszewski et al. |
| 6,670,299 | B1 | * | 12/2003 | Marks et al. ............ 502/152 |

FOREIGN PATENT DOCUMENTS

| EP | 0341012 | 11/1989 |
| EP | 0870809 | 10/1998 |
| WO | WO 98/01480 | 1/1998 |
| WO | WO 00/56795 | 9/2000 |

OTHER PUBLICATIONS

U.S. Appl. No. 10/269,556, filed Oct. 11, 2002.
U.S. Appl. No. 09/359,359, filed Jul. 23, 1999.
U.S. Appl. No. 09/534,827, filed Mar. 23, 2000.
U.S. Appl. No. 10/034,908, filed Dec. 21, 2001.
U.S. Appl. No. 10/118,519, filed Apr. 6, 2002.
U.S. Appl. No. 10/271,025, filed Oct. 15, 2002.
U.S. Appl. No. 10/289,545, filed Nov. 7, 2002.
Carter et al., "Polyimide Nanofoams From Phase-Separated Block Copolymers", Electrochemical Society Proceedings, 1997, pp. 32-43, vol. 97, No. 8, Electrochemical Society, Pennington, NJ, US.
Chen et al., "Pryolytic Behavior and In-Situ Paramagnetism of Star-like C60(CH3)x(PAN)xcopolymers", European Polymer Journal, Mar. 1, 1998, pp. 421-429, vol. 34, No. 3-4, Elsevier Science Ltd., Oxford, GB.
Dorota Greszta et al., "Gradient Copolymers of Styrene and Acrylonitrille Via Atom Transfer Radical Polymerization", Polymer Preprints, Apr. 1997, pp. 709-710, vol. 38(1).
Gromada, J.; Matyjaszewski, K. Macromolecules 2001, 34, 7664-7671.

(Continued)

Primary Examiner—Robert D. Harlan
(74) Attorney, Agent, or Firm—Kirkpatrick & Lockhart Nicholson Graham LLP

(57) ABSTRACT

Disclosed is a process for the removal and recycle of a supported transition metal catalyst complex from a polymerization reaction medium comprising the steps separating the supported transition metal catalyst from the reaction medium and contacting the supported transition metal catalyst with a reducing agent. The reducing agent may be a transition metal and/or a source of radicals. Also disclosed is a process for the recovery of transition metal catalyst from a reaction medium, comprising changing the conditions of a medium comprising transition metal catalyst attached to a solid support, wherein changing the conditions causes desorption of the transition metal catalyst from solid support.

22 Claims, 6 Drawing Sheets

OTHER PUBLICATIONS

Jin-Shan Wang and Krzysztof Matyjaszewski, "Controlled/"Living" Radical Polymerization. Atom Transfer Radical Polymerization in the Presence of Transition-Metal Complexes". Reprinted from the Journal of the American Chemical Society, 1995, vol. 117, No. 20.

Jin-Shan Wang and Krzysztof Matyjaszewski, "Controlled/"Living" Radical Polymerization. Halogen Atom Transfer Radical Polymerization Promoted by a Cu(I)/Cu(II) Redox Process". Reprinted from Macromolecules, 1995, 28. Department of Chemistry, Carnegie Mellon University. Received May 2, 1995; Revised Manuscript Received Aug. 14, 1995.

Krzysztof Matyjaszewski, Mingli Wei, Jianhui Xia and Nancy E. McDermott, "Controlled/"Living" Radical Polymerization of Styrene and Methly Methacrylate Catalyzed by Iron Complexes1", Macromolecules, vol. 30, No. 26, 1997.

Krzysztof Matyjaszewski, Simion Coca, Scott G. Gaynor, Mingli Wei and Brian E. Woodworth, "Zerovalent Metals in Controlled/ "Living" Radical Polymerization", Macromolecules, 1997, pp. 7348-7350, vol. 30, No. 23.

Matyjaszewski, K.; Editor Controlled/Living Radical Polymerization. Progress in ATRP, NMP, and RAFT. In: ACS Symp. Ser., 2000; 768, 2000., Chapter 19 "Reverse Atom Transfer Radical Polymerization Using AIBN or BPO as Initiator" pp. 263-275.

Matyjaszewski, K.; XIA, J. Chem. Rev. 2001, 101, 2921-2990.

Mingli Wei, Jianhui Xia, Nancy E. McDermott and Krzysztof Matyjaszewski, "Atom Transfer Radical Polymerization of Styrene in the Presence of Iron Complexes", Polymer Preprints, 38(2), 231 (1997), Department of Chemistry, Carnegie Mellon University.

Qiu, J.; Matyjaszewski, K; Thouin, L.; Amatore, C. Macromol. Chem. Phys. 2000, 201, 1625-1631.

Queffelec, J.; Gaynor, S.G.; Matyjaszewski, K. Macromolecules 2000, 33, 8629-8539.

Simion Coca, Christina B. Jasieczek, Kathryn L. Beers and Krzysztof Matyjaszewski, "Polymerization of Acrylates by Atom Transfer Radical Polymerization. Homopolymerization of 2-Hydroxyethyl Acrylate", Journal of Polymer Science, 1998, pp. 1417-1424, vol. 36, Part A: Polymer Chemistry.

Seong Mu Jo et al, "Polyacrylonitrile with Low Polydispersities by Atom Transfer Radical Polymerization", Polymer Preprints, vol. 38(1) Apr. 1997, pp. 697-698.

Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699-700.

Takeichi et al., "Preparation of Porous Carbon Films by the Pyrolysis of Poly(Urethane-imide) Films and Their Pore Characteristics", Carbon, Feb. 2001, pp. 257-265, vol. 39, No. 2.

Timothy E. Patten and Krzysztof Matyjaszewski, Atom Transfer Radical Polymerization and the Synthesis of Polymeric Materials, Advanced Materials 1998 10 No. 12, 901-915.

T.E. Patten et al., "Polymers with very Low Polydispersities from Atom Transfer Radical Polymerization", Science, vol. 272, pp. 866-868, May 10, 1996.

U. Schubert et al., "Design of Effective Systems for Controlled Radical Polymerization of Styrene: Application of 4,4'-Dimethyl and 5,5'-Dimethyl 2,2'Bipyridine Copper(ii) Complexes", Macromol. Rapid Commun., vol. 20, No. 6, pp. 351-355, 1999.

Wang et al., "Living"/Controlled Radical Polymerization, Transition-Metal-Catalyzed Atom Transfer Radical Polymerization in the Presence of a Conventional Radical Initiator, Macromolecules, 1995, vol. 28, pp. 7572-7573.

Wang, J.-S.; Matyjaszewski, K., J. Am. Chem. Soc. 1995, 117, 5614-5615.

Xia J. and Matyjaszewski K., "Controlled/"Living" Radical Polymerization. Homogenous Reverse Atom Transfer Radical Polymerization Using AIBN as the Initiator," Macromolecules, 1997, pp. 7692-7696, vol. 30.

* cited by examiner

| Curve 1: | PTH21-1 |
| Curve 2: | PTH21-2 |
| Curve 3: | PTH21-3 |
| Curve 4: | PTH21-4 |
| Curve 5: | PTH21-5 |

CATALYST SYSTEM FOR CONTROLLED POLYMERIZATION

CROSS REFERENCE TO RELATED APPLICATIONS

This application is a divisional of U.S. application Ser. No. 09/972,056, filed Oct. 5, 2001 now U.S. Pat. No. 6,790,919, which claims priority from provisional U.S. Application Ser. No. 60/238,812, filed Oct. 6, 2000.

FIELD OF INVENTION

The present invention relates to catalysts for atom transfer radical polymerization processes. Specifically, the present invention relates to a hybrid catalyst system comprising transition metal complexes held in close conjunction with a solid support and of a soluble ligand, or soluble transition metal complex or desorbed catalyst.

BACKGROUND OF THE INVENTION

There is a continuing effort in polymer chemistry to develop new polymerization processes and new polymers. A relatively recent development in polymer chemistry has been the development of controlled or living polymerization processes. A controlled or living polymerization process is one in which chain transfer and termination reaction are essentially nonexistent relative to the polymer propagation reaction. These developments have led to the production of polymers that exhibit macro functionality and to the development of functional polymers that possess specific chemical reactivity. The new polymers extend the level of control available to materials engineers in processing polymers and using polymers as building blocks in, or components for, subsequent material forming reactions, such as copolymerizations, chain extensions and crosslinking reactions, and interaction with substrates, including dispersed solids.

A significant economic hurdle which continually needs to be overcome in this effort is to provide the benefits of controlled polymerization from available low cost monomers in available commercial process equipment. These long term objectives have provided the backdrop, or driving force, for the continuing advances in controlled polymerization of radically (co)polymerizable monomers, disclosed in earlier patent applications, and provide the incentive to extend, simplify and make more robust the process known as atom transfer radical polymerization (ATRP).

The recently developed ATRP process and polymers developed from the classic ATRP reaction are described in U.S. patent applications Ser. No. 09/018,554 and 09/534,827, the entire contents of which are hereby incorporated herein by reference. Methods for exercising control over many parameters in a catalytic process for the controlled polymerization of a wide range of free radically (co)polymerizable monomers have been described in publications authored or co-authored by Krzysztof Matyjaszewski and others. See for example, Wang, J. S. and Matyjaszewsk, K., *J. Am. Chem. Soc.*, vol. 117, p. 5614 (1995); Wang, J. S. and Matyjaszewsk, K., *Macromolecules*, vol. 28, p. 7901 (1995); K. Matyjaszewski et al., *Science*, vol. 272, p. 866 (1996); K. Matyjaszewski et al., "Zerovalent Metals in Controlled/"living "Radical Polymerization," *Macromolecules*, vol. 30, pp. 7348–7350 (1997); J. Xia and K. Matyjaszewski, "Controlled/"Living "Radical Polymerization. Homogenous Reverse Atom Transfer Radical Polymerization Using AIBN as the Initiator," *Macromolecules*, vol. 30, pp. 7692–7696 (1997); U.S. patent application Ser. No. 09/126,768, the entire contents of which are hereby incorporated by reference; U.S. Pat. Nos. 5,807,937, 5,789,487, 5,910,549, 5,763,548, 5,789,489, 5,945,491, 6,111,022, 6,121,371, 6,124,411 and U.S. patent application Ser. Nos. 09/034,187, 09/018,554, 09/431,871, 09/359,359, 09/359,591, 09/369,157, and 09/534,827 the entire contents of each are hereby incorporated herein by reference. The subtle interactions between the parameters have been further explored and implementation of the teachings disclosed in these publications has allowed the preparation of many inherently useful novel materials displaying control over functionality and topology, and production of novel tele-functional building blocks for further material forming reactions, resulting from application of the site specific functional and topological control attainable through this robust controlled polymerization process for free radically (co)polymerizable monomers.

The system or process employed to gain control over the polymerization of free radically (co)polymerizable monomers has been described in earlier applications as comprising the use of four components: (i) an initiator molecule; (ii) a transition metal compound having (iii) an added or associated counterion and the transition metal compound complexed with (iv) a ligand(s). The initiator molecule, or polymerization originator molecule may be any molecule comprising one or more radically transferable atom(s) or group(s) capable of participating in a reversible redox reaction with the transition metal compound. The transition metal compound may include an added or associated counterion and comprise a transition metal salt. So that all reactive oxidation states are soluble to some extent in the reaction medium, the transition metal may be complexed with the ligand(s). The components of the system may be optimized to provide more precise control for the (co)polymerization of the free radically polymerizable monomers. See U.S. Pat. No. 5,763,548, the entire contents of which are hereby incorporated herein by reference.

In an embodiment known as "reverse" ATRP, the initiator molecule described above can be formed in-situ by reaction of a free radical with the redox conjugate of the transition metal compound. Other components of the polymerization system such as the choice of the radically transferable atom or group, counterion initially present on the transition metal, and optional solvent may influence the process. U.S. Pat. No. 5,807,937 provides as an example of a single molecule containing a combination of functions, a complex in which the counterion and ligand components are in one molecule. The role of a deactivator, the "persistent radical," or for ATRP, the transition metal redox conjugate, is also described in U.S. Pat. No. 5,807,937.

While not to be limited to the following description, the theory behind ATRP disclosed in the previous work is that polymerization proceeds essentially by cleavage (and preferably essentially homolytic cleavage) of the radically transferable atom or group from the initiator molecule or, during the polymerization process the dormant polymer chain end, by a reversible redox reaction with a complexed transition metal catalyst, without any strong carbon-transition (C-$M_t$) bond formation between the active growing polymer chain end and the transition metal complex. Within this theory as the transition metal complex, in a lower active oxidation state, or in its activator state, activates the initiator or dormant polymer chain end by homolytically removing the radically transferable atom or group from the initiating molecule, or growing polymer chain end, in a reversible redox reaction, an active species is formed that allows other chemistry, essentially free radical based chemistry to be conducted. The transition metal complex in the higher oxidation state, the redox conjugate state or deactivator state, transfers a radically transferable atom or group to the active initiator molecule or growing chain end, thereby reforming the lower oxidation state transition metal complex. When free radical based chemistry occurs, a new molecule comprising a radically transferable atom or group is also formed. In prior publications, the catalytically active transition metal compound, which can be formed in situ or added as a preformed complex, has been described as containing a range of counterions. The counterion(s) may be the same as the radically transferable atom or group present on the initiator, for example a halide such as chlorine or bromine, or may be different radically transferable atoms or groups. An example of the latter counterion is a chloride counterion on the transition metal compound when the initiator first contains a bromine. Such a combination allows for efficient initiation of the polymerization followed by a controlled rate of polymerization, and has additionally been shown to be useful in certain crossover reactions, from one set of (co)monomers to a second set of (co)monomers, allowing efficient formation of block copolymers.

ATRP is one of the most promising methods in the field of controlled/"living" radical polymerizations, one which can be applied to a wide variety of monomers and provide well defined polymers. However, one of the commercial limitations of ATRP is the presence of a transition metal complex, which is often present in concentrations above what is normally considered catalytic levels that can be left in the products. Therefore is some applications, the catalyst should be removed after the polymerization. Several processes for the preparation and use of immobilized ATRP catalysts have been proposed to reduce the concentration of catalyst remaining in the polymer product. Processes have been attempted using ATRP catalysts immobilized on silica, crosslinked polystyrene beads or attached to polymer chain; all of which can provide an efficient way conducting the polymerization or be used for separating and recycling of the catalyst. However, generally these techniques still suffer, to some degree, from a lack of the control over the polymerization originating from the heterogeneous nature of the process. Not wishing to be limited by the description of the mechanism, this loss of control may be attributable to an insufficient deactivation rate of the growing radical which results from the slow diffusion of the active growing polymer chains to the immobilized deactivator complexes, which leads to a much higher-molecular weight and broader molecular weight distribution than in homogeneous systems.

Thus, there exists a need for an catalyst system for controlled polymerization that is easily separable from the reaction medium and provides sufficient control over the process. More, specifically there exists a need for a catalyst system for ATRP which allows sufficient deactivation of the growing polymer chains to provide a controlled polymerization process.

SUMMARY OF THE INVENTION

The present invention meets these needs by providing a polymerization process comprising polymerizing radically (co)polymerizable monomers in the presence of a system comprising an initiator comprising one or more radically transferable atom(s) or group(s) and a catalyst system comprising a transition metal, one or more counterions, a ligand attached to a solid support, and a soluble ligand. The present invention also provides polymerization process comprising polymerizing radically (co)polymerizable monomers in the presence of a system comprising an initiator comprising one or more radically transferable atom(s) or group(s), an attached transition metal complex, and a soluble transition metal complex.

The ligand or the transition metal complex may be physico- or physicochemically or chemically bound to the surface of a solid support through ionic bonding, physisorption, chemisorption, Van der Waals forces, coordinate or covalent bonding. The soluble transition metal complex or ligand may be formed by changing a (co)polymerization condition to cause at least a portion of the transition metal complex or ligand to be unbound from the surface of the added solid. A process for the removal and recycle of a supported transition metal catalyst complex from a polymerization reaction medium comprising separating the supported transition metal catalyst from the reaction medium, and contacting the supported transition metal catalyst with a reducing agent is also provided.

DETAILED DESCRIPTION OF THE INVENTION

Figure 1:
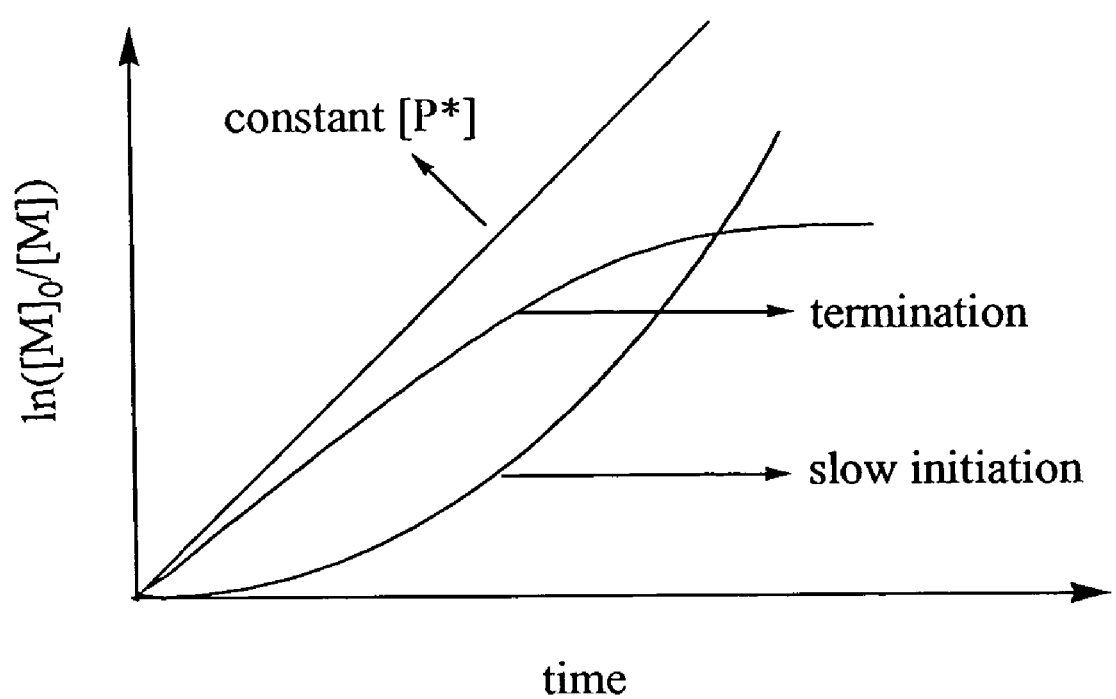
FIG. 1 is a graph illustrating the dependence of $\ln([M]_0/[M])$ versus time for various controlled and uncontrolled polymerization processes.

The process of the present invention overcomes the diffusion limitation by providing a new catalyst concept comprising the use of a small amount of soluble deactivator in addition to the immobilized catalyst system was examined. This disclosure therefore is directed towards extending the utility of transition metal mediated controlled radical (co)polymerization processes by defining conditions for the controlled polymerization of radically (co)polymerizable monomers using a hybrid catalyst system.

The hybrid catalyst of the present invention comprising a transition metal complex attached to a solid support, providing catalyst immobilization, and a low level of soluble catalyst which may be formed by, for example, providing a soluble ligand or alternatively a low level of unattached transition metal complex present in the polymerization medium, or other means to allow the catalyst deactivator to be more readily available to the growing polymer chain. The hybrid catalyst system may initially comprise the combination of an attached catalyst system and an unattached ligand, or an attached transition metal and an unattached transition metal complex, or an attached catalyst system acting in conjunction with other components or parameters of the process that can form an active complex for deactivation of the growing polymer chain under the conditions of the polymerization. In such a hybrid system the transition metal complex is attached by being physico- or physicochemically or chemically bound to the surface of a solid support through ionic bonding, physisorption, chemisorption, Van der Waals forces, coordinate or covalent bonding.

In one such a hybrid catalyst system the transition metal complex is held in close conjunction with the solid support by chemical bonding through utilization of an attached ligand but is made available to the "living" controlled polymerization occurring in close contact with the solid support through interaction with an added soluble ligand, without the invention being limited by the explanation, we believe that this hybrid system operates through a transitory formation of a low level of transition metal complex in the liquid phase next to the solid support. In an alternate system the hybrid catalyst system can be formed through interaction of a preformed transition metal catalyst complex with a solid support by being physico- or physicochemically or chemically bound to the surface of a solid support through ionic bonding, physisorption, chemisorption, Van der Waals forces, or coordinate bonding and act as a hybrid catalyst system through the presence of an excess of a soluble ligand of different non-bonding or non-absorbing structure, again without being limited by the explanation we believe that this allows a transitory formation a low level of transition metal complex in the liquid phase next to the solid support. By judicious selection of the soluble ligand one can provide for the "soluble" transition metal complex to be predominately the redox conjugate of the attached transition metal complex and therefore preferentially selected for deactivation of the growing radical. As a further method of forming a hybrid catalyst system there is an attached transition metal catalyst complex and a lower level of unattached transition metal complex, preferentially comprising the deactivator oxidation state of the catalyst complex, interacting to control the polymerization process.

In a further option for the formation of a hybrid catalyst system, the ligand can be chosen so that it desorbs from the solid support to a sufficient degree to directly form a hybrid system under polymerization conditions and then reforms a solid supported catalyst system under conditions used for catalyst removal and catalyst recycle. A non-limiting choice for forming such a hybrid catalyst system under this option is to add to the reaction medium a low boiling solvent that desorbs the necessary concentration of catalyst from the support, preferentially in the redox conjugate state. After the polymerization, the solvent can be removed under the influence of heat or vacuum, extraction or other separation technique known in the art, thereby driving the catalyst to return to the solid support for substantially complete separation from the product. For copper based catalysts, for example, this process may include a polar solvent. Another method of forming such a desorbable hybrid catalyst system is to design a transition metal complex that is strongly adsorbed to the solid surface at one temperature but is sufficiently desorbed at the polymerization conditions to control the polymerization.

The term hybrid can be considered, without limiting us to the specific definition, as an essentially biphasic polymerization system, one in which the bulk of the transition metal complex is closely held in contact with an added solid, so that low levels of the transition metal would be found in the contacting polymerization medium at the end of the polymerization process, but the transition metal is made sufficiently present, and active as a catalyst in the polymerization system, by interaction with a soluble ligand added to the polymerization medium, or with an added soluble transition metal complex, or made available through selection of the reaction conditions, or by addition of other components of the reaction medium to provide a controlled polymerization process.

For the present purposes "polymers" include homopolymers and (co)polymers (unless the specific context indicates otherwise), which may be block, random, statistical periodic, gradient star, graft, comb, (hyper)branched or dendritic polymers. The "(co)" parenthetical prefix in conventional terminology is an alternative, viz., "(co)polymer means a copolymer or polymer, including homopolymer, while "(co) polymerizable means a monomer that is directly polymerized by the polymerization mechanism being discussed and additionally includes a comonomer which can only be incorporated into the polymer by copolymerization. Similarly "(hyper)" is meant to incorporate the concept that the degree of branching along the polymer backbone can vary from a low degree of branching up to a very high degree of branching.

Here, and elsewhere in the text the word "control and/or controlled" means that in the polymerization process conditions are defined whereby the contributions of the chain breaking processes are insignificant compared to chain propagation, so that polymers with predetermined molecular weights, low polydispersity and high functionalities are achievable.

It is widely accepted that controlled polymerization should display the following features.

Feature 1. First-order kinetics behavior, i.e. the polymerization rate ($R_p$) with respect to the monomer concentration ([M]) is a linear function of time. This is due to the lack of termination, so that the concentration of the active propagating species ([P*]) is constant.

$$R_p = \frac{-d[M]}{dt} = k_p[P^*][M] \quad (1.1)$$

$$\ln\frac{[M]_0}{[M]} = k_p[P^*]t = k_p^{app}[P^*]t \text{ (if } [P^*] \text{ is constant)} \quad (1.2)$$

$k_p$ is the propagation constant. The result of eq. 1.2 is illustrated in FIG. 1.

This semilogarithmic plot is very sensitive to the change of the concentration of the active propagating species. A constant [P*] is revealed by a straight line, and an upward curvature indicates an increased [P*], which occurs in case of a slow initiation. On the other hand, a downward curvature suggests the decrease of [P*], which may result from termination or some other side reactions such as the catalytic system being poisoned.

It should also be noted that the semilogarithmic plot is not sensitive to chain transfer process or slow exchange between different active species, since they do not affect the number of the active propagating species.

Feature 2. Predetermined degree of polymerization ($X_n$), i.e. the number average molecular weight ($M_n$) is a linear function of monomer conversion.

$$X_n = \frac{M_n}{M_0} = \frac{\Delta[M]}{[I]_0} = \frac{[M]_0}{[I]_0} \text{ (conversion)} \quad (1.3)$$

Figure 1A:
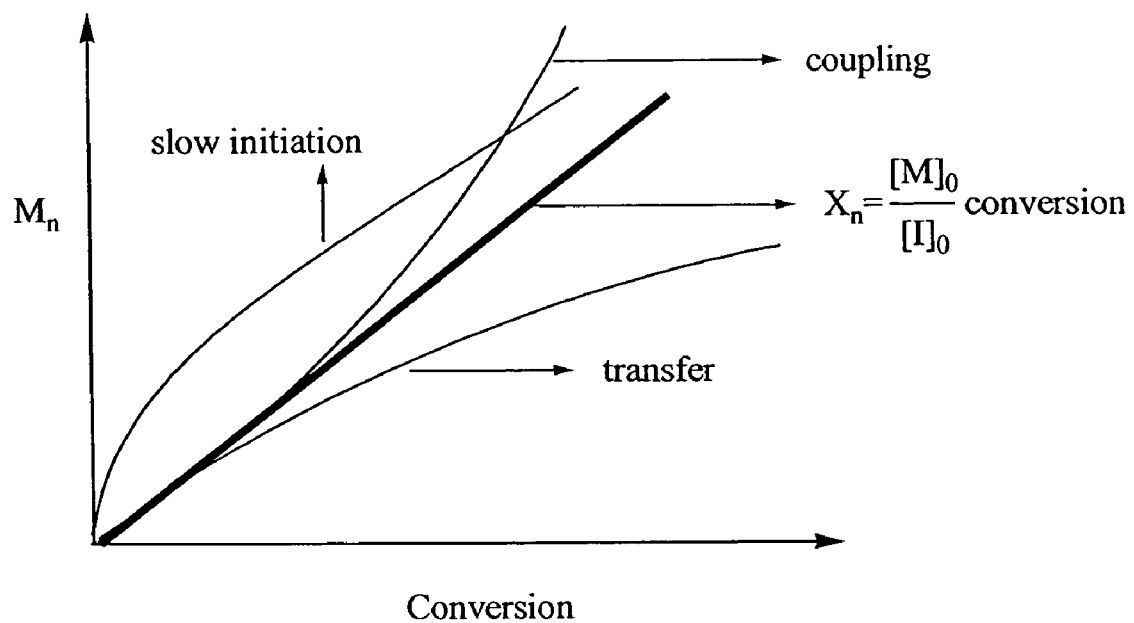
FIG. 1a is a graph illustrating the dependence of molecular weight versus conversion for and ideal controlled polymerization and the effects of the slow initiation, chain transfer and coupling of uncontrolled polymerization processes on the molecular weight change versus conversion.

This result comes from a constant number of chains throughout the polymerization, which requires the following two conditions:
a) the initiation should be sufficiently fast so that nearly all chains start to grow simultaneously; and
b) no chain transfer occurs to increase the total number of chains. FIG. 1a illustrates the ideal growth of molecular weights with conversion, as well as the effects of slow initiation and chain transfer on the molecular weight evolution.

Importantly, the evolution of molecular weights is not very sensitive to chain termination, since the number of chains remains unchanged. Only when coupling reaction plays a significant role for polymers with very high molecular weights, is the effect of termination observable on the plot.

Feature 3. Narrow molecular weight distribution. Although this feature is very desirable, it is not necessarily the result from a controlled polymerization, which requires only the absence of chain transfer and termination, but ignores the rate of initiation, exchange and depropagation. Substantial studies [Gold, 1958 #84; Coleman, 1963 #88; Matyjaszewski, 1995 #85; Hsieh, 1996 #81; Matyjaszewski, 1996 #86] indicate that in order to obtain a polymer with a narrow molecular weight distribution, each of the following five requirements should be fulfilled.
i. The rate of initiation is competitive with the rate of propagation. This condition allows the simultaneous growth of all the polymer chain.
ii. The exchange between species of different reactivities is faster than propagation. This condition ensures that all the active chain termini are equally susceptible to reaction with monomer for a uniform growth.
iii. There must be negligible chain transfer or termination.
iv. The rate of depropagation is substantially lower than propagation. This guarantees that the polymerization is irreversible.
v. The system is homogenous and mixing is sufficiently fast. Therefore all active centers are introduced at the onset of the polymerization.

An essentially narrow molecular weight distribution is attained which should yield a Poison distribution, as quantified in eq. 1.4.

$$\frac{X_w}{X_n} = \frac{M_w}{M_n} = 1 + \frac{X_n}{(X_n+1)^2} \cong 1 + \frac{1}{X_n} \quad (1.4)$$

According to eq.1.4, polydispersity ($M_w/M_n$) decreases with increasing molecular weight. A polymerization that satisfies all five prerequisites listed above is expected to have a final polymer with a polydispersity less than 1.1 for $X_n$ greater than 10.

Feature 4. Long-lived polymer chains. This is a consequence of the negligible chain transfer and termination. Hence, all the chains retain their active centers after the full consumption of the monomer. Propagation resumes upon the introduction of additional monomer. This unique feature enables the preparation of block copolymers by sequential monomer addition.

Figure 2:
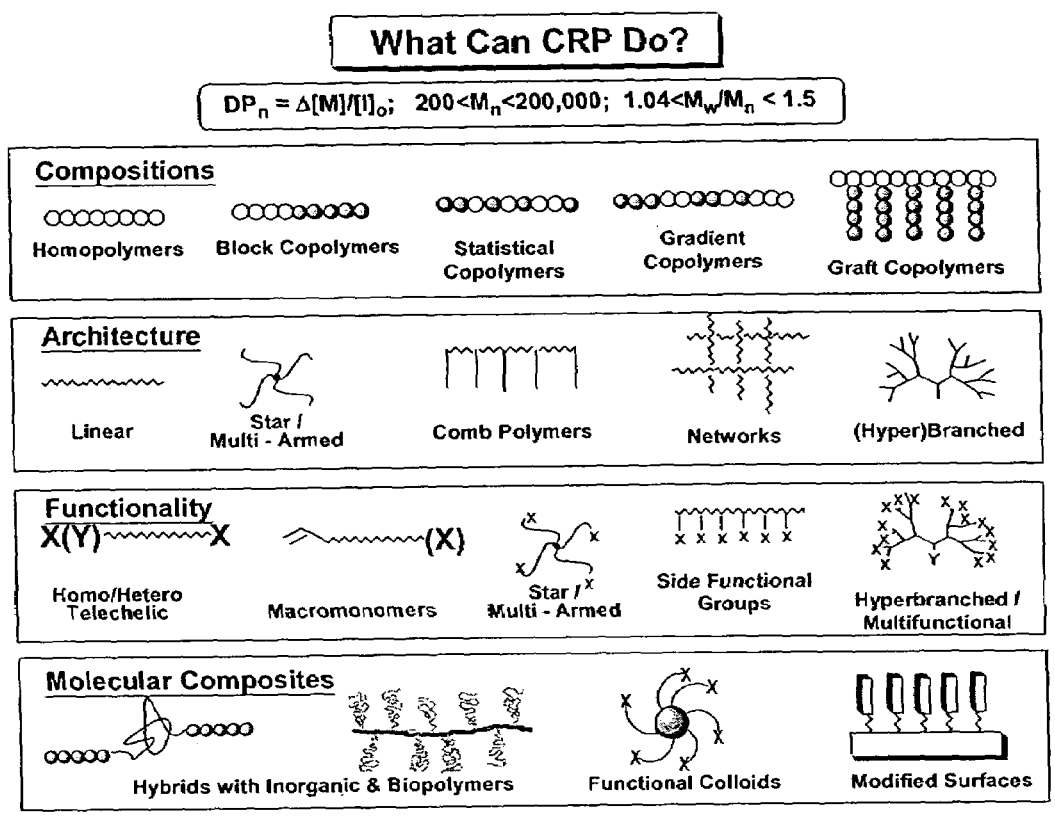
FIG. 2 is a table illustrating examples of the polymers which may be produced by controlled polymerization processes.

The significance of controlled polymerization as a synthetic tool is widely recognized. Polymers having uniform and predictable chain length are readily available. Controlled polymerization provides the best opportunity to control the bulk properties by selection and control of various aspects of the multitude of variations in composition, functionality and topology at a molecular level. The result of such control the preparation of polymeric materials is shown schematically in FIG. 2.

This control over polymer structure or composition is not, or should not be lost as one moves towards conducting the polymerization with the disclosed hybrid catalyst, a catalyst comprising an "attached" transition metal complex and "available" transition metal complex. The "available" transition metal complex can be formed in-situ by the sole addition of a "free" ligand which forms a transitory soluble active transition metal complex by interacting with the attached transition metal, the first hybrid mediated polymerization process taught in this application, or can be added as a second soluble transition metal complex, optionally in the redox conjugate state; or a further component of the polymerization process can be added to desorb sufficient transition metal complex from the solid support to allow formation of a hybrid system, or the reaction conditions can be changed sufficiently from conditions during the polymerization to allow resorption of the desorbed catalyst from the reaction medium. Preferably, as little as 5% of ligand or transition metal complex may be soluble to provide control over the polymerization.

In one case in point the transition metal complex is "attached", or held in close contact with a resin, by using one or more ligands directly attached to the solid support in the formation of the transition metal complex. The transition metal is made fully accessible to the polymerization mixture by the presence of a soluble ligand in the polymerization medium. One illustration of the improved process using an organic support, described in detail below, is the use of DOW ion exchange resins with attached amine functionality, which acts as a ligand for a transition metal compound to form a supported transition metal complex catalyst. In another example, an amine based ligand is attached to an inorganic support such as silica through design of a ligand that interacts with the surface of the silica. The supported transition metal complex comprising such an attached ligand, forms a hybrid catalyst complex after the addition of a soluble ligand, such as tris[2-(dimethylamino)ethyl]amine ($Me_6TREN$), to the polymerization medium and the hybrid system supports a controlled polymerization process. $Me_6TREN$ is known to form a complex with copper that has a very high deactivation rate constant.

Without being limited by the explanation we envision that the use of a ligand such as $Me_6TREN$ is particularly useful choice since $Me_6TREN$ preferentially forms a soluble complex with the redox conjugate of the transition metal, i.e. the higher oxidation state of the transition metal, forming a complex that is active in the deactivation of the growing radical chain, which is essential if one desires a polymerization process that exhibits high initiator efficiencies and provides polymers exhibiting narrow molecular weight distribution, in contrast to prior art supported catalyst disclosures. This is one of the most preferred approaches to the formation of a hybrid catalyst system since in a commercial operation the feed to the solid supported transition metal complex can just additionally comprise a low concentration of liquid, soluble ligand in the monomer/initiator solution being fed to the bed of supported catalyst. In a further option, one can add a low concentration of a reducing agent to reduce the concentration of the attached redox conjugate which would tend to increase due to unavoidable termination reactions. The reducing agent can comprise any species that reacts with a transition metal in its higher oxidation state and reduces it to a lower oxidation state and can include sources of free radicals or a transition metal in a zero oxidation state.

In a non-limiting description of the mechanism for controlled polymerization using such a hybrid catalyst system an attached transition metal forms an active group from an initiator or growing polymer chain by transfer of a radically transferable group from the molecule to the transition metal complex thereby forming both the redox conjugate of the transition metal complex and an active molecule that can add monomers. This active polymer chain end can be preferentially deactivated or returned to a dormant polymer chain end comprising a radically transferable atom or group by transfer of such a radically transferable atom or group from a soluble redox conjugate of the transition metal complex wherein the ligands of the transition metal complex are soluble in the polymerization medium. This forms a soluble transition metal complex in which the transition metal is in a lower oxidation state, but if the ligand chosen to form the soluble transition metal has been chosen to preferentially exist as the higher oxidation state complex then this newly formed lower oxidation state soluble transition metal complex, will remove a radically transferable atom or group from an attached higher transition metal complex reforming the preferred hybrid catalyst system comprising an attached complex of lower oxidation state and soluble complex of higher oxidation state in addition to having allowed a controlled increase in the molecular weight of the polymer in contact with the hybrid catalyst system.

An alternate embodiment is to directly add the low level of a preformed soluble transition metal complex to the solid supported transition metal complex thereby directly forming the desired hybrid catalyst system in the absence of an added excess of soluble ligand. In a further embodiment additional control over the polymerization is obtained if the low level of soluble transition metal complex added to form the hybrid catalyst system is the redox conjugate of the attached transition metal complex. In such a system a small amount of the deactivator can exist in the solution phase to afford fast deactivation of the growing radical and reduce the diffusion barrier presented by requiring diffusion of the growing radical chain end to a supported deactivator. To obtain a successful hybrid catalyst system, the deactivator should meet several requirements. The deactivation rate constant for the soluble deactivator should be high and the soluble deactivator should be more reducing than the immobilized catalyst to thereby be reconverted to the higher oxidation state species continuously and rapidly after the deactivation step.

A further process that can be used to form a hybrid catalyst system is to add a preformed transition metal complex, formed by complexation of a transition metal compound with a ligand that has been pre-selected to strongly interact with an added solid. The complex is added to the selected solid support and thereafter held in close conjunction with such an added solid solely through ionic bonding, physicosorption, chemisorption, Van der Waals forces, or coordinate bonding and be converted into, or act as, a hybrid system through the presence of a low level of excess media soluble ligand of different non-bonding or non-absorbing structure which, again without being limited by the explanation, we believe can form a transitory low level of active transition metal complex in the liquid polymerization phase comprising the monomers next to the solid support; or in conjunction with a low concentration of added soluble transition metal complexes. Again, as an alternative approach to an operating hybrid transition metal complex system one can add the redox conjugate of the transition metal, formed with a media soluble ligand, to the polymerization process. In this system in which the transition metal complex is added to a solid support and is held through ionic bonding, physicosorption, chemisorption, Van der Waals forces, or coordinate bonding the ligand can be selected to allow sufficient transition metal complex to desorb from the added solid under polymerization conditions to function to control the polymerization. In such a system with one selected ligand the system acts as a hybrid catalyst through selection of the conditions for polymerization to additionally form the hybrid catalyst. In such a system the added solid support can comprise any solid support that does not interact with the polymerization to additionally form the hybrid catalyst. In such a system the added solid support can comprise any solid support that does not interact with the polymerization but allows sufficient transition metal complex to desorb and act to control the polymerization. Such solids include silica, aluminates and clays.

$CN_6TREN$ was chosen as a first exemplary ligand for such a hybrid catalyst system based on such adsorption/desorption of the transition metal complex through hydrogen bonding of the ligand to the inherent functionality present on the surface of the added solid. This ligand would be strongly adsorbed onto a polar substrate such as a silica particle. In the initial experiments we determined that in a homogeneous system this ligand did provide a transition metal complex that provided a controlled polymerization. In the presence of silica however the molecular weight distribution of the polymer produced with such a strongly adsorbed hybrid catalyst system was close to 2.0. This indicates that the complex was very strongly absorbed onto the silica surface and as with the ligand supported catalyst the redox conjugate of the transition metal catalyst was not readily accessible to the growing active polymer chain. This would indicate that one should to tailor the strength of the physisorption to the surface to obtain optimum control over the polymerization. This can be accomplished by adding a solvent to assist in the desorption at the polymerization temperature. Another procedure would be to modify the substituents on the ligand to control the strength of the absorption/desorption and another would be to tether specific functionality to the surface and then fully control the interaction of the ligand with the attached functionality. The concentration of the tethered functionality on the surface of the particle can be also be controlled as can the strength of the interaction between the tethered functionality and the functionality on the ligand. The type of functionality used to tether the ligand to the surface can comprise a substituant on the ligand including hydroxy, amine, imine, as well as other functionality.

A further preferred embodiment of such a hybrid catalyst system, one that can be utilized to regenerate the catalyst during recycle in a batch polymerization system, or during extended operation of a continuous polymerization system while employing a solid supported catalyst, is the optional embodiment of utilizing the added soluble ligand to regenerate the catalyst by transportation of a transition metal in the zero oxidation state to the solid supported transition metal complex to thereby reduce the excess redox conjugate transition metal complex formed by the unavoidable low level of termination reactions, even in such a well controlled polymerization process.

This is demonstrated in the experimental section in a non-limiting example applicable to a batch polymerization system utilizing copper as the attached transition metal where after the solid catalyst complex is separated from the formed polymer the free ligand can be added to the monomer solution and copper zero can be added to the mixture as a solid, wire, mesh or powder in sufficient concentration, and for sufficient time, to reduce any additionally formed redox conjugate. One method is to immerse a copper rod into the mixture for a short, though sufficient time to form a complex with the added free ligand and thereby be transported to the attached redox conjugate. When the transition metal complex has been adjusted to form the desired mixture of transition metal oxidation states then initiator is added to initiate the controlled polymerization.

In a continuous operation the free ligand can used to transport a sufficient, low concentration of transition metal in the zero oxidation state to compensate for any build up in concentration of the redox conjugate. The amount of required transition metal complex in the zero oxidation state can be calculated or monitored by examination of the conversion level at constant flow. If the conversion level decreases then increased metal zero complex, or other reducing agent such as a source of free radicals, is required to increase the initiation or activation activity of the supported transition metal catalyst. If the molecular weight distribution of the formed polymer increases then lower levels of metal zero complex, or added reducing agent, is required since reduced levels of available redox conjugate leads to poorer control over the deactivation process.

While this application was in transition from a provisional application to an application a patent application WO 00/75198 was published. This application describes "A method for preparing a supported catalyst system and its use in a polymerization system" and was filed Jun. 3, 1999. While it claims to utilize a "hybrid catalyst system" it is not the hybrid catalyst system if this invention. WO 00/75198 describes a dual catalyst system for the polymerization of olefins and describes a catalyst system that should provide for the preparation of two different polymers. The system is of course still transfer dominated but the principle must be different from the instant invention disclosed herein wherein we must really have a single catalyst system, one that involves a kind of shuttle, with the individual components of the catalyst constantly changing but providing a single homogeneous polymer as the product of the polymerization process.

There has been a continuing effort to make the controlled radical polymerization process known as ATRP as environmentally benign and as low cost a process for the preparation of functional materials as possible. One concern expressed about the processes disclosed in disclosed in U.S. Pat. Nos. 5,763,546; 5,807,937; 5,789,487; 5,945,491; 6,111,022; 6,121,371; 6,124,411 and U.S. patent application Ser. Nos. 09/034,187; 09/018,554; 09/431,871; 09/359,359; 09/359,591; 09/369,157; and 09/534,827; processes for the preparation of polymers displaying control over the polymer molecular weight, molecular weight distribution, composition, architecture, functionality and the preparation of molecular composites and tethered polymeric structures is the presence of a transition metal in the immediate product of the reaction. Although several improvements directed at catalyst separation, catalyst recycle and increased catalyst activity were disclosed in the above patents and patent applications, a need persisted, one we believed has now been overcome, to thwart this potential barrier to commercialization. WO 99/28352 describes an ATRP process utilizing a pyridineimine based supported ligand. The present disclosure overcomes the poor control over molecular weight distribution found in such prior art biphasic catalyst systems by providing systems wherein the redox conjugate of the attached activator transition metal complex, the deactivator is available to the growing polymer chain.

When the biphasic system described in the prior art is employed for controlled radical polymerization an area of particular concern is access of the growing polymer chain to the persistent radical for the polymerization system. In ATRP this means that the active growing polymer chain should have access to the transition metal complex in the higher oxidation state and that such a redox conjugate transition metal complex should comprise a radically transferable atom. Example 269 in application Ser. No. 09/534,827 first describes the use of a biphasic supported catalyst, and while the polymerization was successful the molecular weight distribution of the formed polymer was greater than 2.25 throughout the polymerization. In the work described in WO 99/28352 by Haddleton the reported molecular weight distribution (MWD) for the polymers formed in the presence of a solid supported catalyst are also quite broad; in a paper, Haddleton; et al. Macromolecules 1999, 32, 4771, the MWD is reported to be around 1.5. Work of another group in this field, Shen et al, also report MWD close to 1.5 Both these prior art observations of poor control over molecular weight distribution can be attributed to poor access to the persistent radical for the controlled polymerization process, this phenomenon will exacerbated as the molecular weight of the polymer increases due to viscosity and resulting diffusion effects.

When a supported ligand is used to prepare a transition metal complex, as described in the prior art, an understanding of the means to produce an effective low level of "homogeneously" available, or appropriately partitioned, transition metal redox conjugate was not available within the chemistry of the prior art processes. The approaches we now disclose make the redox conjugate of the transition metal complex available in the polymerization medium while retaining low instantaneous metal concentration in the system. One such approach is to add low levels of soluble unattached ligand or soluble transition metal complexes to the system forming a hybrid catalyst system. The ligand can be selected to act as a shuttle between the polymerization medium and the supported catalyst.

This approach additionally allows an expedient method for reactivation of the formed hybrid catalyst during catalyst recycle for batch polymerization systems or during continuous operation wherein the soluble ligand is used to shuttle transition metal in a zero oxidation state to the supported catalyst regenerating the transition metal complex by reducing the concentration of the formed redox conjugate.

This hybrid catalyst concept was first evaluated using a polystyrene based ion exchange resin with an attached amine functionality, one that could function as a ligand in the formation of a transition metal complex suitable as a catalyst for ATRP. The reaction scheme to prepare the immobilized catalyst (CuBr/PS-bpy) is shown in Scheme 1. The 4,4'-dimethyl-2,2'-bipyridine was covalently immobilized on a Merrifield resin initially containing a benzyl chloride functional group to minimize leaching of the catalyst from the support. The Merrifield resin was based on a lightly crosslinked polystyrene (5 mol % divinylbenzene) with the average particle size of 8 μm. The metallation of the ligand with CuBr afforded the immobilized catalyst ($1.15 \times 10^{-3}$ mol-ligand/g-catalyst, determined by elemental analysis).

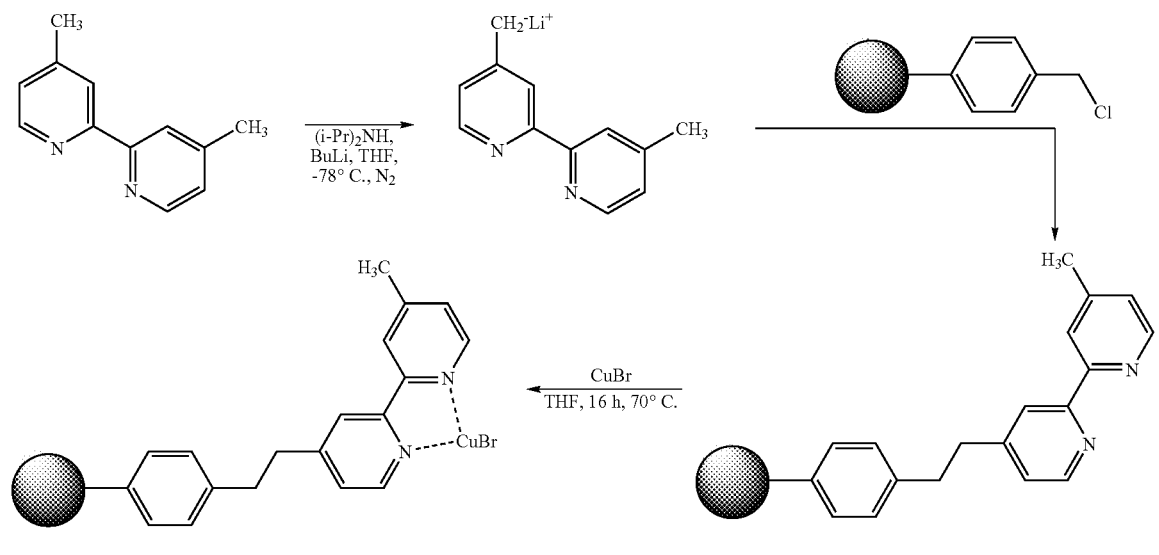

Scheme 1.

The exemplary soluble ligand chosen to demonstrate conversion of this attached catalyst complex into a hybrid complex was based on the Me$_6$TREN ligand, although any ligand described as suitable for forming a catalyst active in ATRP would also find utility. The addition of an excess of soluble ligand alone converted this adsorbed catalyst into a hybrid system.

Other approaches evaluated to provide a hybrid catalyst system are to utilize a preformed transition metal catalyst complex that is held in close conjunction with an added solid such as alumina, silica, crosslinked polystyrene beads and/or clay through being physico- or physicochemically or chemically attached to the surface of the solid support through ionic bonding, physisorption, chemisorption, Van der Waals forces, coordinate or covalent bonding, and converted into a hybrid system by the presence of a low level of excess soluble non-bonding ligand, soluble transition metal complex or desorbable transition metal complex. This approach to a hybrid catalyst is demonstrated by the preparation of a diamine ligand for support of an ATRP catalyst on an inorganic support such as silica. This was accomplished by the synthesis of N,N,N'-trimethyl-N'[3-(trimethoxysilylporpoxycarbonyl)ethyl]-ethylenediamine shown below in scheme 2.

Scheme 2.

This diamine based ligand for the preparation of a transition metal complex suitable for use as an ATRP catalyst has an attached trimethoxy silyl group for immobilization on silica was synthesized through Micheal addition reaction of amine.

The transition metal can also be attached to a solid support, such as silica, though hydrogen bonding, in such a case the transition metal is attached by strong adsorption forces and not a formal chemical bond. The concept is that the temperature of the polymerization sufficient catalyst can desorb from the surface of the particle to provide a partitioned catalyst and be reabsorbed under conditions used for recovery of the polymer. One ligand used to evaluate this concept was CN$_6$TREN which would be strongly adsorbed onto a solid polar substrate.

Another approach to obtaining reverse binding architecture through supermolecular assembly between the ligand and the matrix using hydrogen bonding, one that could be particularly useful in the construction and use of such supermolecular structures as catalysts, is to examine the effect of a spacer between the binding sites and the bonding sites. 2-Ureidopyrimidin-4-ones was used since strong non-covalent binding can be obtained via multiple hydrogen bond arrays. With this unit in the ligand, ultra strong non-covalent coupling can be achieved at low temperature between the ligand and the support matrix, while free ligand should be available at high temperature.

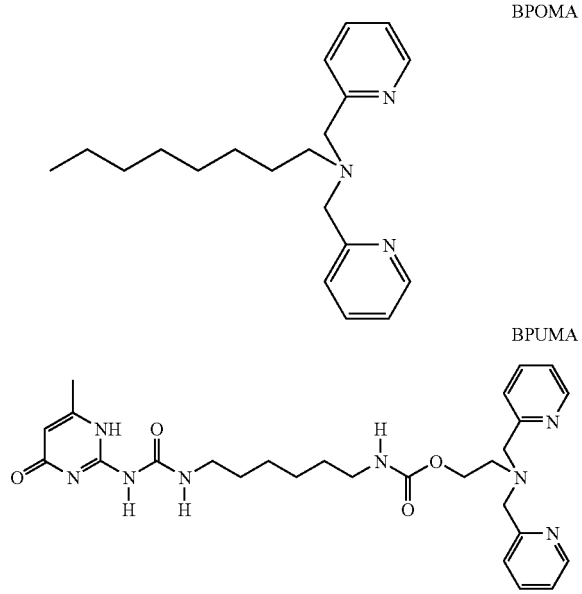

BPOMA

BPUMA solvent or monomer before reuse. Residual monomer and optional solvent, which can be selected to assist in the formation of the transition metal complex Mechanism The overall action of the hybrid catalyst system is summarized in Scheme 3. Because the rate constant of activation with $Cu^I$/bpy is in the range of $k_a \sim 10^0$ L $mol^{-1}$ $s^{-1}$, the activation of polymeric alkyl halide should not be significantly affected by a slow diffusion of the polymeric chains to the solid immobilized catalyst ($k_{diff} \sim 10^5$ L $mol^{-1}$ $s^{-1}$). The activation process can therefore readily be performed by the immobilized catalyst (CuBr/PS-bpy), present in large excess to the deactivator. However, diffusion of polymer coils to the surface of the solid support can become a rate-determining step in the deactivation process for a completely immobilized catalyst ($k_d \gg k_{diff}$), particularly at high conversion. On the contrary, if a soluble deactivator ($CuBr_2/Me_6TREN$) is present in the solution phase this species can deactivate the active radical efficiently without any diffusion limitation. The rate of the deactivation is in the range of $k_d \sim 10^7$ L $mol^{-1}$ $s^{-1}$. The resulting $CuBr/Me_6TREN$ may rapidly reconvert to $CuBr_2/Me_6TREN$ by abstracting halogen from the immobilized catalyst ($CuBr_2$/PS-bpy) thereby completing the catalytic cycle. Overall, the soluble deactivator may act as a "shuttling" agent that delivers the halogen from the solid immobilized catalyst to growing polymeric radicals to achieve an effective deactivation process.

Scheme 3.

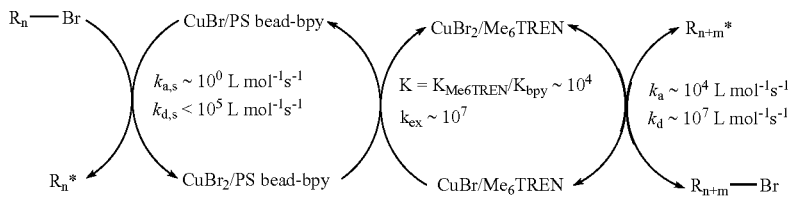

Experimental Section: Discussion

The hybrid catalyst system discussed in this application can be used in both continuous biphasic polymerization systems or in batch polymerization systems. The examples described below exemplify a batch polymerization system wherein monomers, optional solvent, and a low concentration of free ligand, or added soluble transition metal complexes wherein the transition metal is present in the desired oxidation state and with the desired counterion if required, is added to a reactor containing the transition metal complex attached to a solid substrate either directly through chemical bonding of the ligand to the solid, or indirectly through a substituent present on the ligand that further interacts with the added solid as defined above. The biphasic reaction mixture is agitated, or stirred, or the liquid phase is pumped around, or a fixed bed of catalyst is employed as the stirrer to mix the liquid intimately with the solid, or any other process that can dynamically bring the monomers and growing polymer chains into dynamic contact with the transition metal complex/solid is employed, such that after an appropriate time, at an appropriate temperature and pressure, the conversion of monomer to polymer has progressed to prepare a polymer of desired molecular weight; then the product is removed from the solid comprising the transition metal complex by filtration or centrifugation under reaction conditions or conditions other than those employed for the polymerization. The solid is optionally washed with Preparation of Supported Catalyst Complex As further examples of one type of supported hybrid catalyst systems three different kinds of anion exchange resin, supplied by DOW, were used to test their potential first as a material that formed a ligand supported ATRP catalyst and secondly as components of a hybrid catalyst system based on ligand supported transition metal catalysts. The first two resins are identified as M4195 and XVS 43578, both of which contain bispicolyl amine functionality; XVS 43578 has a more uniform particle size distribution. The third resin is identified as HPPA and contained an attached hydroxy-picolylamine functionality. The resins were supplied with the amine functionality in the form of sulfate salts. Therefore it was necessary to neutralize them prior to use to give attached free amine functionality which can play the role of ligand(s) in the formation of an ATRP catalyst as previously disclosed. The resins were first washed with freshly distilled water followed by neutralization with 1 M NaOH just to alkaline by PH paper. During this neutralization procedure the color of the resins change from yellow to brown. The resins were then washed with fresh water and methanol, successively and dried under vacuum. The amount of free amine functionality present, and available for use as a ligand, in the resins was determined by carbon/hydrogen/nitrogen analysis. The resin supported ligand-metal complexes were formed by contacting the resin with $CuBr/CuBr_2$ (8/2 mol/mol). A measured amount of resin, CuBr, and CuBr$_2$ was introduced into the reactor in the ratio of [ligand in resin]:[CuBr]:[CuBr$_2$]=1:0.8:0.2 followed by evacuation and nitrogen backfilling for 3 times. Separately, dry tetrahydrofuran distilled over sodium was degassed by three freeze-pump-thaw cycles. A measured amount of dry, degassed tetrahydrofuran was introduced into the reaction flask under nitrogen and the temperature of the reaction bath was increased to 70° C. and the reaction, forming the ion exchange resin supported transition metal complex, was allowed to continue overnight. The obtained transition metal catalyst/resin complexes were washed twice with dry, degassed tetrahydrofuran and then twice with pentane. The final resin was dried under vacuum.

General Polymerization Procedure

Methyl methacrylate polymerization was performed with HPPA and XVS 43578 resins to evaluate them as a supported ATRP catalyst. The polymerizations were first done without any additional soluble ligand such as Me$_6$TREN and the polymerizations showed linear increase of conversion with time but no increase of molecular weight with conversion. This suggests very poor deactivation of growing radical, i.e. the resin supported ligand-metal complexes essentially acted solely as redox initiators and the resulting broad molecular weight distribution can be attributed to the poor accessibility of growing radical to the Cu(II) centers on the support resins, even though some 20% of the transition metal sites present on the solid were in the form of the redox conjugate.

One approach to the formation of a hybrid catalyst, using the above procedure can be an in-situ complexation of ligand with the transition metal salt in the polymerization medium. HPPA and XVS 43578 resins were neutralized and evaluated using this method. In these experiments about 3% of Me$_6$TREN-CuBr$_2$ complex compared to attached or supported ligand was added to the polymerization medium. This is as an alternative to providing only soluble ligand. This approach forms an initial supported catalyst/soluble ligand transition metal complex hybrid system with immediately accessible redox conjugate. Such an approach should enhance the control on polymerization. Indeed the conversion and molecular weight increased linearly with time and the MWD was narrow (~1.5), evidence of controlled polymerization.

The polystyrene based resin-bpy-CuBr/Me$_6$TREN-CuBr$_2$ hybrid catalyst was tested for methyl methacrylate polymerization with 1 mol % of Me$_6$TREN-CuBr$_2$ to attached bpy-CuBr transition metal complex. The polymerization was found to be fully controlled. This is part of a continuing effort to decrease, and ultimately determine a minimum amount of excess ligand or added transition metal complex, exemplified by Me$_6$TREN-CuBr$_2$ in the above discussion, necessary to control the reaction. Minimization of the level of free ligand will decrease the rate at which the catalyst can migrate through a bed of catalyst in a fixed bed reactor or minimize the amount of transition metal complexes that will remain in the final product in a batch polymerization system. For this reason we propose that the hybrid resin formed to conduct the polymerization contain less than 25% of free unattached, non-complexing ligand, preferably less than 15%, more preferably less than 10% and most preferably less than 5%. Such an approach will reduce the overall cost of catalyst in the ATRP system and simplify the process and minimize transition metal loss from the solid support and minimize the environmental impact of incorporating an ATRP process into the processes employed at commercial plant.

The control over polymerization was dramatically improved in an immobilized catalyst based ATRP by using or forming an additional small amount of reducing soluble catalyst. High conversion of monomer to polymer is feasible allowing the formation of polymer with a predetermined molecular weight and a narrow molecular weight distribution. The hybrid catalyst system afforded a clear colorless polymer solution by a simple filtration or sedimentation. The residual amounts of Cu in the polymers were greatly reduced less than 1 ppm while sufficient control over the polymerization was retained. The hybrid catalyst system seems to afford a better method for the successful ATRP with a low concentration of the transition metal in the polymerization medium.

Figure 3:
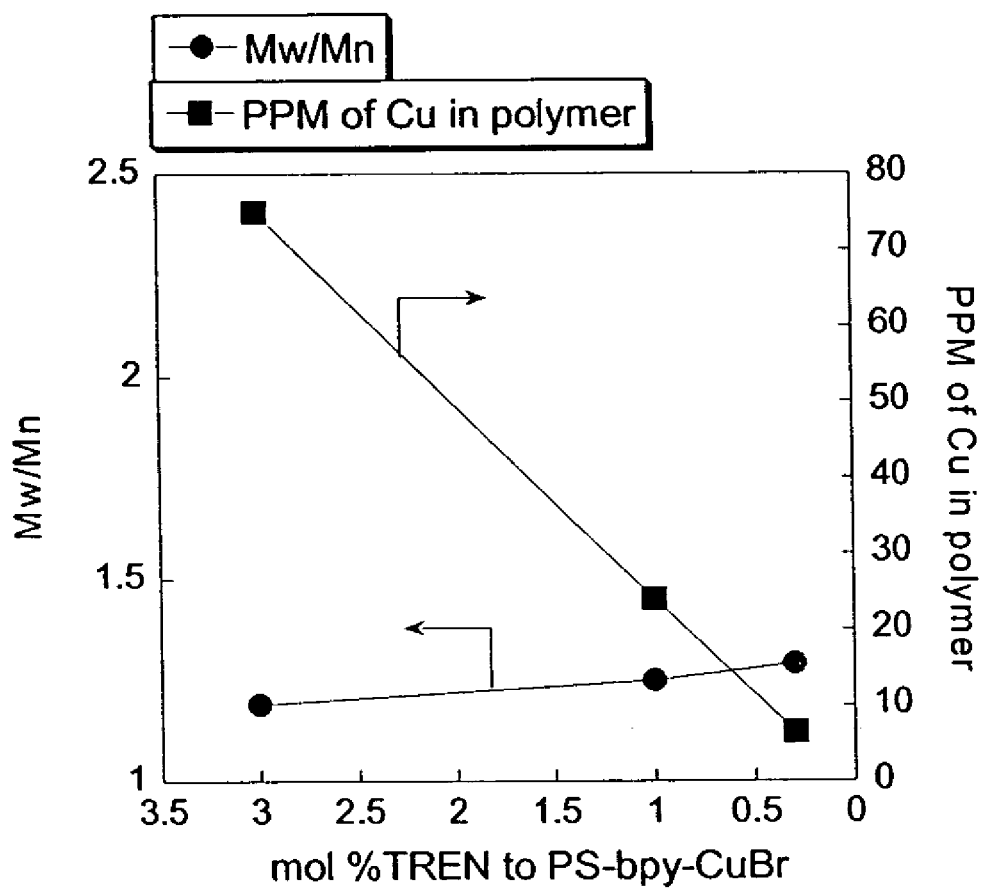
FIG. 3 is a graph illustrating the calculation of the maximum concentration of residual copper in the polymer.

In summary a hybrid catalyst system can be formed by addition of a low level of a soluble ligand, or a low level of soluble transition metal complex, to a polymerization system comprising a solid supported transition metal complex. In such a system there is a finite concentration of transition metal that could remain in the formed polymeric product. We additionally have determined that the molecular weight distribution of the polymer formed in such a hybrid catalyst system is dependent of the concentration of available transition metal complex in the polymerization medium. As such it is possible to calculate, the variation of molecular weight distribution and the maximum calculated value for the residual Cu in polymer produced, based on the added amount of Me$_6$TREN added. The results of this calculation is shown in FIG. 3. The maximum residual Cu content in polymer can be reduced to 6 ppm while the molecular weight distribution remains below 1.3. It is possible that the actual level of copper or other transition metal will be below this level since there is an additional equilibrium between the transition metal which complexes with an attached ligand and with the "free" ligand and this calculation considers only the maximum.

EXPERIMENTAL SECTION

EXAMPLES

Preparation of Organic Supported Catalyst

Example 1

Preparation of PSbead(8 μm)-bpyCuBr Catalyst

1a. Preparation of PSbead(8 μm)-bpy Ligand:

Feedstock Recipe; PS bead-Cl, 16 g containing 1.104e-2 mol Cl; Dmbpy 10.172 g or 5.521e-2 mol; (IPr)$_2$NH 7.74 mL, 5.521e-2 mol; nBuLi 34.5 mL, 5.521e-2 mol; CuBr 0.3077 g, 2.145e-3 mol (1.2 molar excess).

After purging the oxygen from a three neck 250 mL round bottom flask by charging with N$_2$ follow by vacuum 80 mL of dry THF and 7.8 mL of (iPr)$_2$NH were added after cooling in a dryice/acetone bath. 34.5 mL of n-BuLi was slowly added to this mixture and the resulting reaction mixture was further stirred at −78° C. for 2 h. A solution of dMbpy predissolved in fresh THF was introduced dropwise to the resulting mixture and further stirred at −78° C. for 2 h. In a separate round bottom flask 16 g Psbead-Cl was suspended in dry THF under nitrogen purge. The (IPr)$_2$NH/nBuLi/dMbpy solution was transferred to the PSbead suspension by cannula at −78° C. The reaction temperature was allowed to increase to room temperature and the reaction stirred for an additional 14 h. The product obtained was thoroughly washed with THF and MeOH, two times with each solvent. Drying under vacuum gave the ion exchange resin with an attached bpy ligand as a yellow powder.

1b. Metallation with CuBr.

The modified ion exchange resin from the above step, PS bead-bpy (0.9460 g 2.02e-3 mol bpy ligand) was treated with CuBr (0.290 g 2.02e-3 mol). Both reagents were introduced into 100 mL schlenk flask followed by evacuation with high vacuum and refilled with dehydrated nitrogen for three times and 100 mL of degassed THF was added to the flask to suspend the reagents and the temperature was increased to 70° C. The reaction mixture was stirred at that temperature for 16 h. The product was washed thoroughly with 60 mL of degassed THF and hexane, two times each, by decantation. The catalyst was dried under vacuum to provide the supported transition metal complex as a brown powder. The supported catalyst was stored under dry nitrogen.

1c. Metallation with $CuBr/CuBr_2$ (8/2)

Feedstock: PS bead-bpy 0.4963 g (1.062e-3 mol bpy ligand), CuBr 0.122 g (8.50e-4 mol), CuBr2 0.0474 g (2,12e-4 mol). The reactants were introduced into 100 mL schlenk flask followed by evacuation with high vacuum and refilling with dehydrated nitrogen for three times. Then 100 mL of degassed THF was added to the flask to suspend the reactants and the temperature was increased to 70° C. The reaction mixture was stirred at that temperature for 16 h. The product was washed thoroughly with 60 mL of degassed THF and hexane, two times each by decantation. The catalyst was dried under vacuum to obtain brown powder and stored under dry nitrogen.

Example 2

An Alternate Preparation of Polystyrene Bead Supported bpy-CuBr Catalyst

2a. Preparation of PSbead(8 μm)-bpy-CuBr Catalyst—PS (S)-bpy-102700-1

Recipe: PS bead-bpy 1.79 g; 2.06e-3 mol bpy ligand; CuBr 0.2956 g, 2.06e-3 mol Temperature=60° C., reaction time=overnight (~14 h), solvent=THF 70 mL. 1.79 g of PS bead(8 μm)-bpy and 0.2956 g of CuBr were added to 100 mL Schlenk flask and deoxygenated by evacuation with high vacuum and refilled with dehydrated nitrogen three times. 70 mL of THF was added to the flask to suspend the reagents and the temperature was increased to 60° C. The reaction mixture was stirred at that temperature for 14 h. The resulting product was washed thoroughly three times with 60 mL of deoxygenated THF, once with 60 mL of deoxygenated toluene, and twice with 60 mL of deoxygenated hexane. The dark brown catalyst was dried under vacuum and stored under dry nitrogen in glove box.

2b. Preparation of PSbead(8 μm)-bpy-CuBr2 Catalyst—PS (S)-bpy-102700-2

In order to obtain data for a deactivation rate constant study and material for evaluation of mixed hybrid catalyst system a PSbead(8 m)-bpy, PSbead(8 m)-bpy-CuBr2 complex was prepared. The PS bead supported bpy ligand prepared previous was used for metallation with CuBr2.

Recipe: PS bead-bpy 0.9985 g, containing 1.15e-3 mol bpy ligand; CuBr2 0.2565 g 1.15e-3 mol. Temperature=60° C., time=overnight (~14 h), solvent=THF 50 mL.

0.9985 g of PSbead(8 μm)-bpy and 0.2565 g of CuBr2 were introduced into 100 mL Schlenk flask followed by evacuation with high vacuum and refilling with dehydrated nitrogen three times. 50 mL of THF was added to the flask to suspend the solids and the temperature was increased to 60° C. The reaction mixture was stirred at that temperature for 14 h. The product obtained was washed thoroughly three times with 50 mL of deoxygenated THF, once with 50 mL of deoxygenated toluene and twice with 50 mL of deoxygenated hexane. The dark brown catalyst was dried under vacuum and stored under dry nitrogen in glove box.

Example 3

Activation of Commercial Resins

3a. Supported Amine Ion Exchange Resins.

Three different kind of anion exchange resin were obtained from Dow. Resins identified as M4195 and XVS 43578 contain bispicolylamine as an attached ligand, XVS43578 has a more uniform particle size distribution and HPPA contains hydroxypicolylamine functionality. The resins have amine functionality in the form of sulfate salts. Therefore it is necessary to neutralize them prior to use and provide resins with attached free amine which can play a role of ligand in an ATRP catalyst. The resins were first washed with fresh distilled water for 18 h followed by neutralization with 1M NaOH just to alkaline by PH paper (No change of PH for at least two hours should be confirmed). During this neutralization procedure the color of the resins change from yellow to brown. The resins were washed with fresh water and methanol. The obtained resins were dried under vacuum for 6 h at 60° C. The amount of free amine ligands available in the resins were determined by C, H, and N analysis (M4195, 2.25e-3 mol Ligand/g cat; XVS43578, 2.20e-3 mol Ligand/g cat; HPPA, 2.21e-3 mol Ligand/g cat)

3b. Metallation

The targeted supported transition metal complexes was to make a ligand-metal complexes with each of the resins with $CuBr/CuBr_2$ (812 mol/mol) prior to polymerization experiment. Measured amount of resin, CuBr, $CuBr_2$ ([ligand in resin]:[CuBr]:[$CuBr_2$]=1:0.8:0.2) were introduced into Schlenk tube followed by evacuation and nitrogen backfilling for 3 times. Separately, dry THF distilled over sodium was degassed by three free-pump-thaw cycles. After measured amount of THF was introduced into the reaction flask under nitrogen, the temperature of the reaction bath was increased to 70° C. and the reaction was allowed to continue for overnight. The obtained resin complexes were washed with dry, degassed THF and pentane for twice each. The final supported transition metal resin was dried under vacuum at 60° C.

Use of Organic Media Supported Catalysts

Example 4

ATRP Using Resin HPPA Supported Transition Metal Complexes (hydroxypicolylamine—CuBr/CuBr2 (8/2 mol/mol))

4a: [Comparison Run]

| Composition | | | | |
|---|---|---|---|---|
| HPPA (metallated) | 159 mg | | 1.44e−4 mol Cu | 1.56e−2 mol/L |
| MMA | 4.325 g | 4.62 mL | 4.32e−2 mol | 4.68 mol/L |
| Toluene | | 4.62 mL | | |
| 2-bromopropionitrile | 1.93e−2 g | 12.4 μL | 1.44e−4 mol | 1.56e−2 mol/L |

[MMA]:[Initiator]:[HPPA-Cu(I)Br]:[HPPA-Cu(II)Br$_2$] = 300:1:0.8:0.2
Tp = 90° C.

The reaction components were stirred together in a flask and samples were periodically removed by syringe to follow the progress of the polymerization by GC. The runs were terminated after 24 hours when conversion was close to 80%.

Example 4b

Hybrid Catalyst System Based on HPPA Resin (Hydroxypicolylamine)

4b

| Composition | | | | |
|---|---|---|---|---|
| HPPA resin | 65 mg | | 1.44e−4 mol ligand | 1.56e−2 mol/L |
| CuBr | 16.5 mg | | 1.15e−4 mol | 1.25e−2 mol/L |
| CuBr$_2$ | 7.3 mg | | 3.31e−5 mol | 3.59e−3 mol/L |
| MMA | 4.325 g | 4.62 mL | 4.32e−2 mol | 4.68 mol/L |
| Toluene | | 4.62 mL | | |
| 2-bromopropionitrile | 1.93e−2 g | 12.4 μL | 1.44e−4 mol | 1.56e−2 mol/L |
| Me$_6$TREN | | 1.14 μL | 4.31e−6 mol | 4.67e−4 mol/L |

[MMA]:[Initiator]:[HPPA ligand]:[Me$_6$TREN]:[Cu(I)Br]:[Cu(II)Br2] = 300:1:1:0.03:0.80:0.23.
Tp = 90° C.

Example 5

Use of XVS 43578 as the Resin Support. (bispicolylamine—CuBr/CuBr2 (8/2 mol/mol))

5a [Comparison Run]

| Composition | | | | |
|---|---|---|---|---|
| XVS 43578 (metallated) | 172 mg | | 1.44e−4 mol Cu | 1.56e−2 mol/L |
| MMA | 4.325 g | 4.62 mL | 4.32e−2 mol | 4.68 mol/L |
| Toluene | | 4.62 mL | | |
| 2-bromopropionitrile | 1.93e−2 g | 12.4 μL | 1.44e−4 mol | 1.56e−2 mol/L |

[MMA]:[Initiator]:[XVS-Cu(I)Br]:[XVS-Cu(II)Br$_2$] = 300:1:0.8:0.2
Tp = 90° C.

5b. Hybrid Catalyst System Based on XVS 43578 Resin (Bispicolylamine) 5b

| Composition | | | | |
|---|---|---|---|---|
| XVS43578 resin | 65 mg | | 1.44e−4 mol ligand | 1.56e−2 mol/L |
| CuBr | 16.5 mg | | 1.15e−4 mol | 1.25e−2 mol/L |
| CuBr$_2$ | 7.3 mg | | 3.31e−5 mol | 3.59e−3 mol/L |
| MMA | 4.325 g | 4.62 mL | 4.32e−2 mol | 4.68 mol/L |
| Toluene | | 4.62 mL | | |
| 2-bromopropionitrile | 1.93e−2 g | 12.4 μL | 1.44e−4 mol | 1.56e−2 mol/L |
| Me$_6$TREN | | 1.14 μL | 4.31e−6 mol | 4.67e−4 mol/L |

[MMA]:[Initiator]:[XVS ligand]:[Me$_6$TREN]:[Cu(I)Br]:[Cu(II)Br2] = 300:1:1:0.03:0.80:0.23.
Tp = 90° C.

Both control polymerization runs showed linear increase of conversion with time but no increase of molecular weight with conversion, which suggest very poor deactivation of growing radical. This can be attributed to the poor accessibility of growing radical to the Cu(II) centers on support resins even though some 20% of the transition metal sites are in the form of the redox conjugate. Narrower MWD was seen when the soluble ligand was added.

5c. Hybrid Catalyst System Based on XVS 43578 Resin (DOW Ion Exchange Resin, Bispicolylamine) with 3 mol % of Me$_6$TREN-CuBr$_2$ to Bispicolylamine.

The XVS 43578 resin was tested for MMA polymerization with 3 mol % soluble Me$_6$TREN/CuBr$_2$, compared to attached the concentration of the attached bicpicolylamine-CuBr. The Me$_6$TREN-CuBr$_2$ complex was made in separate stock solution with acetone prior to use.

Ratio of [MMA]:[2-bromopropionitrile]:[bispicolylamine-CuBr]:[Me$_6$TREN-CuBr$_2$]=300:1:1:0.03.

5c.

| Chemical | g | mL | mol | mol/L |
|---|---|---|---|---|
| XVS 43578 | 0.124 | | 1.04e−4 ligand | 1.56e−2 |
| MMA | 3.12 | 3.34 | 3.12e−2 | 4.68 |
| Me$_6$TREN | # | | 3.12e−6 | 4.68e−4 |
| CuBr$_2$ | # | | 3.12e−6 | 4.68e−4 |
| Acetone | | 1.06 | | |
| toluene | | 2.27 | | |

-continued

| Chemical | g | mL | mol | mol/L |
|---|---|---|---|---|
| 2-bromopropionitrile | 1.39e−2 | 8.99e−3 | 1.04e−4 | 1.56e−2 |

Reaction condition: temperature, 90° C.; time, 18 h, [MMA]:[2-bromopropionitrile]:[bispicolylamine-CuBr]:[Me$_6$TREN-CuBr2] = 300:1:1:0.03;
added from stock solution (Stock solution, CuBr$_2$ (3.80e−5 mol) + Me$_6$TREN(3.80e−5 mol) in 13 mL acetone).

The conversion curve showed very nice linear first order kinetic plot. The molecular weight distribution was still fairly narrow (~1.5) and the molecular weight increased linearly although it was higher that the theoretical line. GPC curves showed very nice shift with conversion suggesting very good control over polymerization.

The polymerization results are summarized below.

| Sample | time(h) | Conversion | Mn | Mn(th) | Mw/Mn |
|---|---|---|---|---|---|
| 1 | 1.5000 | 0.19744 | 18360 | 5923.0 | 1.5500 |
| 2 | 3.3300 | 0.36493 | 22570 | 10947 | 1.5400 |
| 3 | 7.0000 | 0.49295 | 31660 | 15227 | 1.5100 |
| 4 | 18.000 | 0.88795 | 39780 | 26638 | 1.4900 |

Example 6

Polymerization of MMA with Bpy-CuBr Supported on PS bead(8 μm) (Newly Prepared Catalyst)—PTH12

Newly prepared catalyst was examined for MMA polymerization without any additional Me$_6$TREN to form a free catalyst in homogeneous phase.

6a. [Comparison Run]

| Feedstock | | | | |
|---|---|---|---|---|
| PS(S)-062600-2 | 71 mg | | 7.95e−5 mol | 1.56e−2 mol/L |
| MMA | 2.388 g | 2.55 mL | 2.39e−2 mol | 4.69 mol/L |
| Toluene | | 2.55 mL | | |
| 2-bromopropionitrile | | 6.87 μL | 7.95e−5 mol | 1.56e−2 mol/L |

[MMA]:[Initiator]:[PS-Cu(I)Br]:[PS-Cu(II)Br$_2$] = 300:1:0.8:0.2,
Tp = 90° C.

The conversion did not increase linearly with time and the molecular weight of the polymer as measured by GPC curves did not change with conversion suggesting that the overall control of polymerization was bad. It seems that the activation is very fast with very slow deactivation because of the poor accessibility of growing radical to Cu(II) centers 6b. Polymerization of MMA with bpy-CuBr Supported on PS Bead(8 μm) Using $Me_6TREN-CuBr_2$—3% of $Me_6TREN-CuBr_2$ to Attached bpy.

6b.

| Chemical | mg | mL | mol | mol/L |
|---|---|---|---|---|
| PS bead-bpy-CuBr | 126 | | 1.45e−4 | 1.56e−2 |
| MMA | 4.36 | 4.65 | 4.35e−2 | 4.67 |
| toluene | | 4.65 | | |
| 2-bromopropionitrile | 19.4 | 12.5e−3 | 1.45e−4 | 1.56e−2 |
| $Me_6TREN$ | 1.00 | 1.15e−3 | 4.35e−6 | 4.67e−4 |
| $CuBr_2$ | 1 | | 4.35e−6 | 4.67e−4 |

Reaction conditions: temperature, 90° C.; time, 24 h, [MMA]:[2-bromopropionitrile]:[bpy-CuBr r]:[$Me_6TREN-CuBr_2$] = 300:1:1:0.03.

The conversion increased continuously and the MWD was very narrow (~1.2). Nice GPC curve shift was observed as the molecular weight increased.

6c. Polymerization of MMA with bpy-CuBr Supported on PS Bead(8 μm) with $Me_6TREN-CuBr_2$-1% of $Me_6TREN-CuBr_2$ to Supported bpy.

A polystyrene based ion exchange resin-bpy-CuBr/$Me_6TREN-CuBr_2$ hybrid catalyst was tested for MMA polymerization with 1 mol % of $Me_6TREN-CuBr_2$ to bpy-CuBr available in the polymerization mixture. This is part of an effort to determine a lower level for the amount of $Me_6TREN-CuBr_2$ which is added to control the reaction. The same recipe and reaction conditions as example 6a were used except only 1% of $Me_6TREN-CuBr_2$ was added. [MMA]:[2-bromopropionitrile]:[bpy-CuBr]:[$Me_6TREN$-$CuBr_2$]=300:1:1:0.01. MWD was around 1.2 and nice GPC shift was observed.

6d. Polymerization of MMA with bpy-CuBr Supported on PS Bead(8 μm) Using $Me_6TREN$ Ligand Only—1% of $Me_6TREN$ to bpy—without the Addition of $CuBr_2$—.

PS bead-bpy-CuBr/$Me_6TREN$ hybrid catalyst was tested for MMA polymerization with 1% of $Me_6TREN$ ligand to bpy-CuBr. This is different from previous experiment (Run No. 6c), since CuBr2 was not added. Only 1% of $Me_6TREN$ ligand was added to the system. By doing this, it is expected that $Me_6TREN$ can extract sufficient Cu catalyst from the support because the binding constant for $Me_6TREN$ is much higher than that for bpy. It is much easier to handle the chemicals because $Me_6TREN$ is liquid and can be measured by syringe. [MMA]:[2-bromopropionitrile]:[bpy-CuBr r]:[$Me_6TREN$]=300:1:1:0.01.

Run No. 6d.

| Chemical | g | mL | mol | mol/L |
|---|---|---|---|---|
| PS-bpy-CuBr | 64e−3 | | 7.36e−5 | 1.56e−2 ligand |
| MMA | 2.21 | 2.36 | 2.21e−2 | 4.67 |
| $Me_6TREN$ | 1.746e−4 | 0.2e−3 | 7.59e−7 | 1.60e−4 |
| toluene | | 2.36 | | |
| 2-bromopropionitrile | | 6.36e−3 | 7.36e−5 | 1.56e−2 |

Reaction condition: temperature, 90° C.; time, 34 h, [MMA]:[2-bromopropionitrile]:[bpy-CuBr]:[$Me_6TREN$] = 300:1:1:0.01

Figure 4:
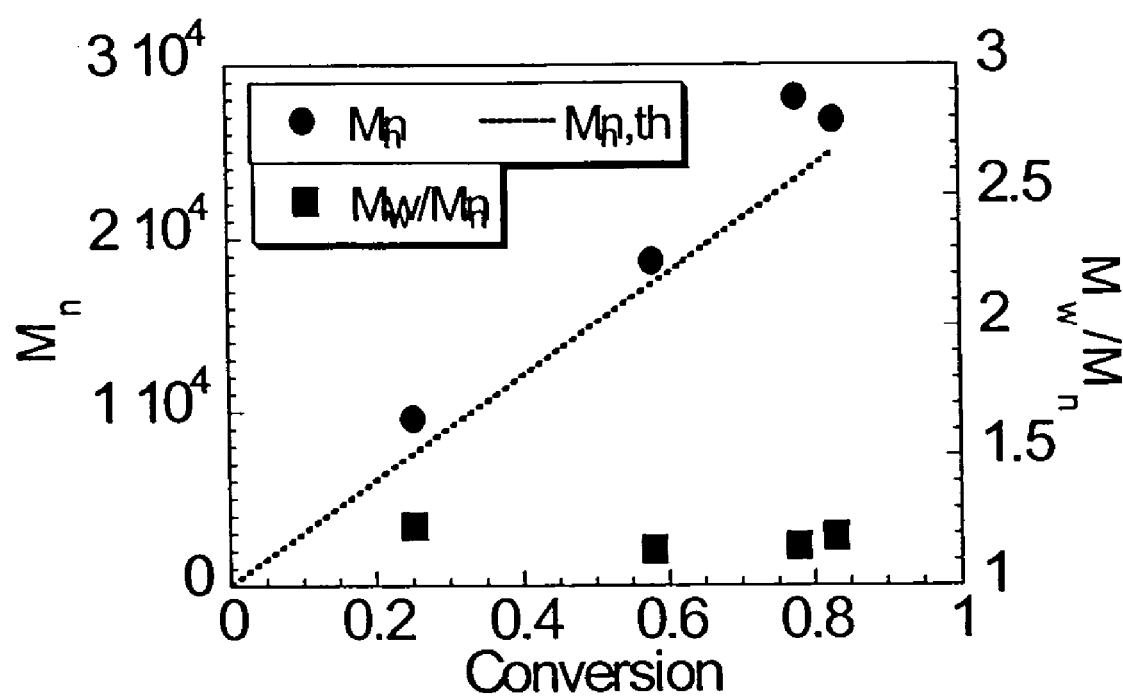
FIG. 4 is graph of the increase of number average molecular weight versus conversion for the polymerization of methyl methacrylate with bpy-CuBr supported catalyst on polystyrene beads (8 µm) using a 3% of soluble Me6TREN-CuBr to supported bpy.
Figure 5:
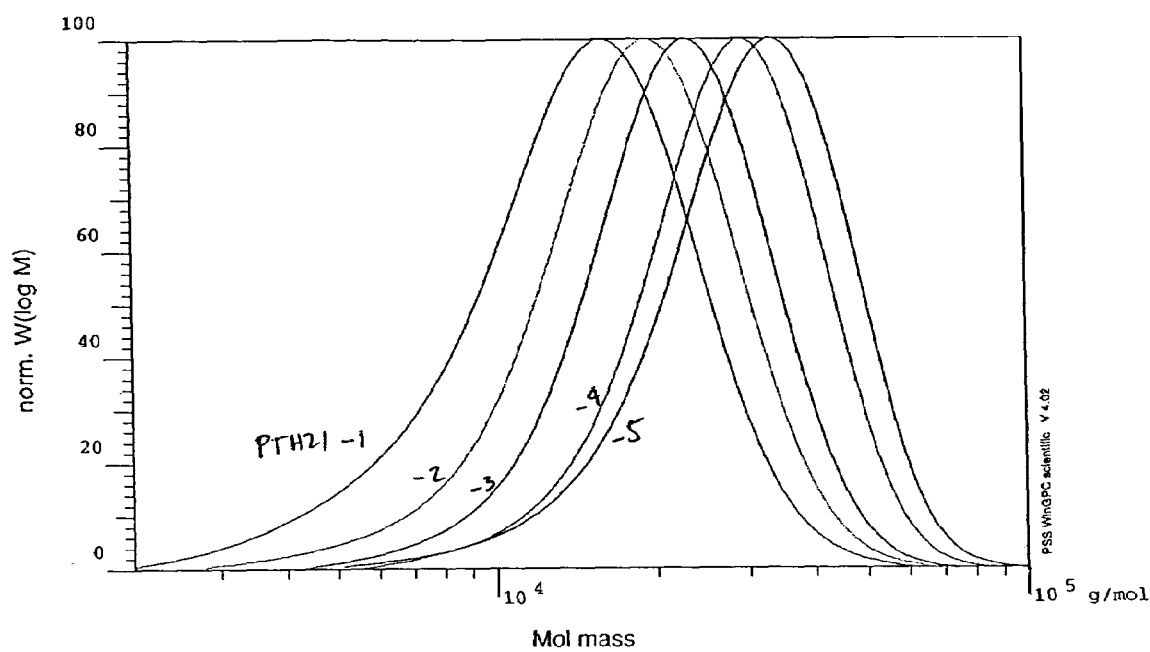
FIG. 5 is a graph of the GPC curves from polymerization of MMA with bpy-CuBr supported on Polystyrene bead (8 µm) using a 1% soluble $Me_6TREN-CuBr_2$ to supported bpy.

The conversion increased with time and the molecular weight distribution was still very narrow (~1.2) and showed linear increase of molecular weight, FIG. 4. GPC curves are shown in FIG. 5 and display a very nice shift with conversion indicating very good control over polymerization.

6e. Polymerization of MMA with bpy-CuBr Supported on PS Bead(8 μm) with 0.3 mol % of $Me_6TREN-CuBr_2$ to bpy The PS bead-bpy-CuBr/TREN hybrid catalyst was tested for MMA polymerization with 0.3 mol % $Me_6TREN/CuBr_2$ to attached bpy-CuBr. Because it is very difficult to handle this tiny amount of chemicals, first stock solution of $Me_6TREN-CuBr2$ was prepared using acetone.

[MMA]:[2-bromopropionitrile]:[bpy-CuBr]:[$Me_6TREN$]=300:1:1:0.003.

6e

| Chemical | g | mL | mol | mol/L |
|---|---|---|---|---|
| PS-bpy-CuBr | 72e−3 | | 8.28e−5 | 1.56e−2 ligand |
| MMA | 2.48 | 2.65 | 2.48e−2 | 4.68 |
| $Me_6TREN$ | | From stock solution | 5.50e−5 | 4.67e−5 |
| $CuBr_2$ | | From stock solution | 5.5e−5 | 4.67e−5 |
| Acetone | | 0.65 | | |
| toluene | | 2.00 | | |
| 2-bromopropionitrile | 11.1e−3 | 7.2e−3 | 8.28e−5 | 1.56e−2 |

Reaction condition: temperature, 90° C.; time, 24 h, [MMA]:[2-bromopropionitrile]:[bpy-CuBr]:[$Me_6TREN-CuBr_2$] = 300:1:1:0.003; Stock solution, $CuBr_2$ (3.80e−6 mol) + Me6TREN(3.80e−6mol) in 10 mL acetone.

The conversion curve showed very nice linear first order kinetic plot. The molecular weight distribution was still very narrow (~1.3) and the molecular weight increased linearly although it was higher that the theoretical line. GPC curves showed very nice shift with conversion suggesting very good control over polymerization only with 0.3 mol % of free $Me_6TREN$ to attached bpy.

SUMMARY TABLE 1

Methyl Methacrylate and Methyl Acrylate Polymerization with Hybrid Catalysts

| Exp No. | Monomer | Hybrid ratio (mol %) | $w_0(Cu)/w_0(monomer)$ (ppm) | Polym. time (h) | Conv. (%) | $M_n$ ($\times 10^3$) | $M_n$ (th.) ($\times 10^3$) | $M_w/M_n$ | $w(Cu)/w(polymer)$ (ppm) |
|---|---|---|---|---|---|---|---|---|---|
| 6a immo | MMA | 0 | 0 | 16 | 59.0 | 71.2 | 17.7 | 2.26 | n.d.[f] |
| 6b | MMA | 100 | 2100 | 22 | 61.8 | 43.7 | 18.5 | 1.73 | n.d.[f] |
| 6c | MMA | 3 | 63 | 24 | 83.0 | 26.8 | 25.0 | 1.19 | 107 |
| 6d | MMA | 1 | 21 | 17 | 89.1 | 32.4 | 26.7 | 1.25 | 27 |
| 6e | MMA | 0.3 | 6 | 24 | 96.9 | 35.5 | 29.0 | 1.29 | 15 |
| DP100MMA | MMA | 1 | 21 | 5.5 | 91.6 | 14.3 | 9.2 | 1.32 | n.d.[f] |
| Cu0 | MMA | 1 | 21 | 5.5 | 92.5 | 40.0 | 27.7 | 1.58 | n.d.[f] |
| MA | MA | 1 | 25 | 51 | 84.7 | 21.5 | 22.6 | 1.09 | n.d.[f] |
| Sty | sty | 1 | 20 | 8 | 51.9 | 15.0 | 15.6 | 1.26 | n.d.[f] |

[f]Catalyst = (CuBr/CuBr$_2$)/Me6TREN (0.97/0.03).

Example 7

Polymerization of MA with bpy-CuBr Supported on PS bead(8 μm) Using Me$_6$TREN-CuBr2-1% of Me$_6$TREN-CuBr2 to bpy-CuBr PS bead-bpy-CuBr/Me6TREN-CuBr2 hybrid catalyst was tested for MA polymerization with 1 mol % of Me6TREN-CuBr2 to bpy-CuBr. First a stock solution of Me$_6$TREN-CuBr2 was prepared in acetone.

[MMA]:[2-bromopropionitrile]:[bpy-CuBr]:[Me$_6$TREN-CuBr2]=300:1:1:0.01.

Run No. 7. [PTH24]

| Chemical | G | mL | mol | mol/L |
|---|---|---|---|---|
| PS-bpy-CuBr | 87e-3 | | 1.01e-4 ligand | 1.51e-2 |
| MA | 2.61 | 2.73 | 3.02e-2 | 5.53 |
| Me$_6$TREN-CiBr2 (from stock sol'n) | | | 1.01e-6 | 1.51e-4 |
| Acetone | | 0.35 | | |
| toluene | | 2.38 | | |
| 2-bromopropionitrile | 1.35e-2 | 8.7e-3 | 1.01e-4 | 1.51e-2 |

Polymerization condition: Monomer = Methyl acrylate [MA]$_0$:[I]$_0$:[bpy-CuBr]$_0$:[Me$_6$TREN-CuBr$_2$]$_0$ = 300:1:1:0.01, Me$_6$TREN-CuBr$_2$ from stock solution in acetone. [MA]$_0$ = 5.55 mol/L; MA/toluene/acetone = 1/0.87/0.13 v/v/v; temperature = 70° C.

The conversion curve showed very nice linear first order kinetic plot. The molecular weight distribution was very narrow (~1.1) and the molecular weight increased linearly with very good agreement with the theoretical molecular weight. The shape of the GPC curves were very symmetrical and the curves showed clear shift to higher molecular weight region with conversion suggesting very good control over polymerization.

The polymerization results are summarized below.

| Sample No. | time(h) | Conversion | Mn | Mn(th) | Mw/Mn |
|---|---|---|---|---|---|
| PTH24-2 | 4.5000 | 0.021669 | 3832.0 | 516.00 | 1.2280 |
| PTH24-3 | 8.0000 | 0.089882 | 5590.0 | 2321.0 | 1.2200 |
| PTH24-4 | 24.000 | 0.47581 | 15700 | 12288 | 1.1100 |
| PTH24-5 | 38.000 | 0.69215 | 18500 | 17876 | 1.1000 |
| PTH24-6 | 51.000 | 0.94256 | 21500 | 22614 | 1.0900 |

Example 8

Polymerization of MMA with bpy-CuBr Supported on PS bead(8 μm) Using PMDETA-CuBr2—1% of PMDETA-CuBr2 to bpy-CuBr PS(8 μm)-bpy-CuBr catalyst with 1 mol % of PMDETA was tested for MMA polymerization. This is the repeat of PTH25 to confirm the result.

Experiment PTH50

| Chemical | g | mL | mol | mol/L |
|---|---|---|---|---|
| PS(8 μm)-bpy-CuBr | 0.093 | | 6.94e-5 | |
| MMA | 2.084 | 2.23 | 2.08e-2 | |
| toluene | | 2.03 | | |
| 2-bromopropionitrile | 9.30e-3 | 6.00e-3 | 6.94e-5 | |
| Me$_6$TREN-CuBr2 (from stock sol'n) | | | 6.94e-7 | |
| Acetone | | 0.17 | | |
| Anisole | | 0.2 | | |

Polymerization condition: Monomer = MMA [MMA]$_0$:[I]0:[PS-bpy-CuBr]$_0$:[Me$_6$TREN-CuBr$_2$]$_0$ = 300:1:1:0.01, Me$_6$TREN-CuBr$_2$ from stock solution in acetone (CuBr2 = 2.38e-5 mol, Me6TREN = 2.38e-5 mol, acetone 10 mL), [MMA]$_0$ = 4.45 mol/L; MMA/solvent (toluene + anisole) = 1/1 (v/v); temperature = 90° C.

The polymerization results are summarized below.

| Sample No. | time(h) | Conversion | Mn | Mn, th | Mw/Mn |
|---|---|---|---|---|---|
| PTH50-1 | 2.0000 | 0.63678 | 21450 | 19106 | 1.3360 |
| PTH50-2 | 5.0000 | 0.76529 | 28550 | 22990 | 1.3520 |
| PTH50-3 | 16.500 | 0.89859 | 32130 | 26995 | 1.4730 |

The molecular weight is much closer to the theoretical value and the MWD is around 1.3~1.4.

Example 9

Polymerization of MMA with bpy-CuBr Supported on PS bead(8 μm) Using dMbpy (dimethyl bpy)-CuBr2—1% of dMbpy-CuBr2 to bpy-CuBr—PTH26

PS bead-bpy-CuBr/dMbpy-CuBr2 hybrid catalyst was tested for MMA polymerization with 1 mol % of dMbpy-CuBr2 to bpy-CuBr. Stock solution of dMbpy-CuBr2 was prepared in acetone. However, even in acetone the complex was not fully soluble. Regardless of the solubility, a calculated part of the stock solution was added by syringe. [MMA]:[2-bromopropionitrile]:[bpy-CuBr]:[dMbpy-CuBr2]=300:1:1:0.01.

Run No. PTH26

| Chemical | g | mL | mol | mol/L |
|---|---|---|---|---|
| PS-bpy-CuBr | 86e−3 | | 9.89e−5 ligand | 1.66e−2 |
| MMA | 2.78 | 2.97 | 2.77e−2 | 4.67 |
| dMbpy-CuBr2 (from stock sol'n) | | | 9.89e−7 | 1.66e−4 |
| Acetone | | 0.2 | | |
| toluene | | 2.77 | | |
| 2-bromopropionitrile | 1.33e−2 | 8.55e−3 | 9.89e−5 | 1.66e−2 |

Polymerization condition: Monomer = Methyl methacrylate
$[MMA]_0:[I]_0:[bpy\text{-}CuBr]_0:[dMbpy\text{-}CuBr_2]_0 = 300:1:1:0.01$,
dMbpy-CuBr$_2$ from stock solution in acetone (not fully soluble)
$[MMA]_0 = 4.67$ mol/L;
MMA/toluene/acetone = 1/0.92/0.08 v/v/v;
temperature = 90° C.

The conversion curve showed linear first order kinetic plot. However, the molecular weight distribution was very relatively broad (~1.5) and the molecular weight did not increased linearly. The shape of the GPC curves were not symmetrical and the curves did not show any shift to higher molecular weight region with conversion suggesting poor control over polymerization originating from the lack of shuttling power of dMbpy (same ligand as the ligand on the support).

The polymerization results are summarized below.

| Sample No. | time(h) | Conversion | Mn | Mw/Mn |
|---|---|---|---|---|
| PTH26-1 | 2.3000 | 0.46103 | 31510 | 1.4460 |
| PTH26-2 | 4.0000 | 0.48036 | 33630 | 1.4850 |
| PTH26-4 | 20.000 | 0.83297 | 32160 | 1.5580 |

Example 10

Polymerization of MMA with bpy-CuBr Supported on PS bead(8 μm) Using dnNbpy (di-nonyl bpy)-CuBr2-1 mol % of dnNbpy-CuBr2 to PS-bpy-CuBr 10a. MMA Polymerization was Tested with dnNbpy as a Soluble Deactivator.

The dnNbpy-CuBr2 complex was formed prior to introduction into the reactor.

Run No. PTH27

| Chemical | g | mL | mol | mol/L |
|---|---|---|---|---|
| PS-bpy-CuBr | 0.106 | | 1.221e−4 | 1.557e−2 |
| MMA | 3.667 | 3.92 | 3.663e−2 | 4.67 |
| dnNbpy-CuBr2 (from stock sol'n) | | | 1.221e−6 | 1.557e−4 |
| Acetone | | 0.2 | | |
| toluene | | 3.72 | | |

-continued

| Chemical | g | mL | mol | mol/L |
|---|---|---|---|---|
| 2-bromopropionitrile | 1.636e−2 | 10.55e−3 | 1.221e−4 | 1.557e−2 |

Reaction conditions: temperature, 90° C.; time, 17 h, [MMA]:[2-bromopropionitrile]:[bpy-CuBr on PS bead]:[dnNbpy-CuBr2] = 300:1:1:0.01; dnNbpy-CuBr2 stock solution in acetone (CuBr2 = 6.11e−5 mol, dnNbpy = 6.11e−5 mol, acetone 10 mL)

The conversion increase with time and but the first order kinetic plot was not linear. The molecular weight distribution was broad (~1.5) and showed no linear increase of molecular weight. GPC curves showed no shift with conversion. These results indicate the control over the polymerization was poor with dnNbpy as a soluble deactivator.

The polymerization results are summarized below.

| Sample No. | time(h) | Conversion | Mn | Mw/Mn |
|---|---|---|---|---|
| PTH27-1 | 1.0000 | 0.15581 | 40940 | 1.9600 |
| PTH27-2 | 3.0000 | 0.46864 | 31100 | 2.0000 |
| PTH27-3 | 7.7000 | 0.77670 | 36030 | 1.7980 |
| PTH27-3 | 17.000 | 0.89252 | 35950 | 1.7350 |

10b. Polymerization of MMA with bpy-CuBr Supported on PS Bead(8 μm)(Regenerated from PTH 27 Experiment) Using dnNbpy-CuBr2 as Soluble Deactivator—1 mol % of dnNbpy-CuBr2 to PS-bpy-CuBr—PTH33

An attempt was made to regenerate the PS bead-bpy-CuBr collected after the PTH27 experiment using Cu wire in toluene solution. The color of the starting material was light green. The color of the resin changed to a light brown at 8 h. The regenerated supported catalyst was tried for methyl methacrylate polymerization.

Run No. PTH33

| Chemical | g | mL | mol | mol/L |
|---|---|---|---|---|
| PS (8 μm)-bpy-CuBr from PTH27 | 0.1754 | | 2.017e−4 | 1.55e−2 |
| MMA | 6.059 | 6.473 | 6.05-2 | 4.67 |
| dnNbpy-CuBr2 (from stock sol'n) | | | 2.017e−6 | 1.55e−4 |
| Acetone | | 1 | | |
| toluene | | 5 | | |
| 2-bromopropionitrile | 2.702e−2 | 17.43e−3 | 2.017e−4 | 1.55e−2 |
| Anisole | | 0.5 | | |

Reaction conditions: temperature, 90° C.; time, 45 h, [MMA]:[2-bromopropionitrile]:[bpy-CuBr on PS bead]:[dNbpy-CuBr2] = 300:1:1:0.01; dNbpy-CuBr2 stock solution in acetone (CuBr2 = 2.017e−5 mol, dNbpy = 2.017e−5 mol, acetone 10 mL)

The activity of the catalyst was only ⅓ of the original activity and conversion reached 60% after 45 h. The molecular weight distribution was relatively narrow (~1.6) and good agreement with theoretical value. The reason for low activity could be attributed to the insufficient regeneration of the supported catalyst ($Cu^{II} \rightarrow Cu^{I}$) or to the loss of Cu during the original polymerization and/or regeneration step.

The polymerization results are summarized below.

| Sample No. | time(h) | Conversion | Mn | Mn, th | Mw/Mn |
|---|---|---|---|---|---|
| PTH33-1 | 1.0000 | 0.061308 | | | |
| PTH33-2 | 3.0000 | 0.32850 | | | |
| PTH33-3 | 6.0000 | 0.36865 | | | |
| PTH33-4 | 20.000 | 0.54073 | | | |
| PTH33-5 | 24.000 | 0.58901 | | | |
| PTH33-6 | 30.000 | 0.60862 | 15570 | 18258 | 1.6290 |
| PTH33-7 | 45.000 | 0.59129 | 13550 | 17915 | 1.6440 |

10c. Regenerated PS(8 μm)-bpy-CuBr Catalyst Polymerization of MMA with Me6TREN-CuBr2 as Soluble Deactivator—1 mol % of Me6TREN-CuBr2 to PS-bpy-CuBr—PTH47

Regenerated PS(8 μm)-bpy-CuBr catalyst was tested for MMA polymerization to check its activity.

Experiment PTH47

| Chemical | g | mL | mol | mol/L |
|---|---|---|---|---|
| PS(8 μm)-bpy-CuBr regenerated from PTH44, 45, 46 | 0.073 | | 4.825e-5 | |
| MMA | 1.449 | 1.55 | | 1.447e-2 |
| toluene | | 1.35 | | |
| 2-bromopropionitrile | 6.46e-3 | 4.17e-3 | 4.825e-5 | |
| Me6TREN-CuBr2 (from stock sol'n) | | | 4.825e-7 | |
| Acetone | | 0.2 | | |
| Anisole | | 0.2 | | |

Polymerization condition: Monomer = MMA $[MMA]_0:[I]_0:[PS\text{-}bpy\text{-}CuBr]_0:[Me_6TREN\text{-}CuBr_2]_0$ = 300:1:1:0.01, $Me_6TREN\text{-}CuBr_2$ from stock solution in acetone ($CuBr_2$ = 2.38e-5 mol, $Me_6TREN$ = 2.38e-5 mol, acetone 10 mL), $[MMA]_0$ = 4.45 mol/L; MMA/solvent (toluene + anisole) = 1/1 (v/v); temperature = 90° C.

The conversion was relatively fast (~85% in 10 h) and excellent control over the polymerization with predetermined molecular weight and narrow molecular weight distribution (~1.3) was obtained with this regenerated catalyst. The GPC traces show clean increase in molecular weight with conversion and no tailing can be observed.

The polymerization results are summarized below.

| Sample No. | time(h) | Conversion | Mn | Mn, th | Mw/Mn |
|---|---|---|---|---|---|
| PTH47-1 | 1.0000 | 0.39968 | 11230 | 11990 | 1.2900 |
| PTH47-2 | 2.5000 | 0.54628 | 16760 | 16388 | 1.2810 |
| PTH47-3 | 5.0000 | 0.71367 | 21400 | 21410 | 1.2860 |
| PTH47-4 | 8.0000 | 0.81093 | 25050 | 24327 | 1.3090 |
| PTH47-5 | 20.000 | 0.90551 | 31010 | 27165 | 1.4130 |

10d. Polymerization of MMA with the Original Catalyst—PTH51

As a comparative experiment, the same polymerization was done with original catalyst (PTH51)

Experiment PTH51

| Chemical | g | mL | mol | mol/L |
|---|---|---|---|---|
| PS(8 μm)-bpy-CuBr original | 0.070 | | 5.1989e-5 | |
| MMA | 1.562 | 1.67 | | 1.560e-2 |
| toluene | | 1.47 | | |
| 2-bromopropionitrile | 6.97e-3 | 4.5e-3 | 5.1989e-5 | |
| Me6TREN-CuBr2 (from stock sol'n) | | | 5.1989e-7 | |
| Acetone | | 0.22 | | |
| Anisole | | 0.2 | | |

Polymerization condition: Monomer = MMA $[MMA]_0:[I]_0:[PS\text{-}bpy\text{-}CuBr]_0:[Me_6TREN\text{-}CuBr_2]_0$ = 300:1:1:0.01, $Me_6TREN\text{-}CuBr_2$ from stock solution in acetone ($CuBr_2$ = 2.38e-5 mol, $Me_6TREN$ = 2.38e-5 mol, acetone 10 mL), $[MMA]_0$ = 4.45 mol/L; MMA/solvent (toluene + anisole) = 1/1 (v/v); temperature = 90° C.

The conversion was compared with that from the regenerated catalyst and the activity of the regenerated catalyst was almost comparable but slightly lower than that of the original catalyst (80~90%). The control over the polymerization was better for the regenerated catalyst.

10e. Ligand and Cu Content Before and After the Regeneration

Ligand and Cu content analysis for the original catalyst and regenerated catalyst were performed through elemental analysis(CHN and Cu analysis, independently) to check the difference between the two catalyst.

| | Cu content (mol Cu/g cat) | Ligand content (mol ligand/g cat) |
|---|---|---|
| Original Catalyst | 7.427e-4 | 1.310e-3 |
| 1st regenerated catalyst | 6.609e-4 | 7.99e-4 |

10f. Second Recycling of PS(8 μm)-bpy-CuBr Catalyst: MMA Polymerization—PTH 55

The immobilized catalyst used in recycling experiments were carefully collected and regenerated again following the same procedure. Therefore this is the second regeneration for this catalyst. The second regeneration catalyst contains 4.752e-4 mol Cu/g cat and 5.460e-4 mol Ligand/g cat. The results are compared with the original and $1^{st}$ regenerated catalysts.

| | Cu content (mol Cu/g cat) | Ligand content (mol ligand/g cat) |
|---|---|---|
| Original Catalyst | 7.427e-4 | 1.310e-3 |
| 1st regenerated catalyst | 6.609e-4 | 7.99e-4 |
| 2nd regenerated catalyst | 4.752e-4 | 5.460e-4 |

As can be seen from the results, it is clear that both the Cu content and Ligand decrease for every regenerated step. This result suggests that the ligand and Cu are immobilized in the catalyst particle through chemical bonding (not a physical absorption). If the Cu and ligand is physically absorbed in the particle, then no further decrease of the content is expected since the particle experienced extensive washing steps in the preparation of the original catalyst and the 1$^{st}$ regeneration steps. The reason for the decrease of the Cu and ligand content is believed to come from two factors that would not apply to a commercial system and therefore do not reduce the utility of the catalyst system. One is the partial fragmentation of the surface layer of the particle, during the severe handling, where the spatial catalyst concentration is high (higher than the core part). Secondly, residual chloromethyl groups in the catalyst particle can initiated the polymerization and the mass of the particle increase for each polymerization steps.

The catalyst obtained after the 2$^{nd}$ regeneration was tested for MMA polymerization.

Experiment PTH55

| Chemical | g | mL | mol | mol/L |
|---|---|---|---|---|
| PS(8 μm)-bpy-CuBr 2nd regenerated | 0.058 | | 2.756e−5 | |
| MMA | 0.828 | 0.884 | 8.268e−3 | |
| toluene | | 0.784 | | |
| Acetone | | 0.12 | | |
| Me6TREN-CuBr2 | | | 2.756e−7 | |
| 2-bromopropionitrile | 3.69e−3 | 2.38e−3 | 2.756e−5 | |
| Anisole | | 0.1 | | |

Polymerization condition: Monomer = MMA [MMA]$_0$:[I]$_0$:[PS-bpy-CuBr]$_0$:[Me$_6$TREN-CuBr$_2$]$_0$ = 300:1:1:0.01, Me$_6$TREN-CuBr$_2$ from stock solution in acetone (CuBr2 = 2.38e−5 mol, Me6TREN = 2.38e−5 mol, acetone 10 mL), [MMA]$_0$ = 4.4 mol/L; MMA/solvent (toluene + anisole) = 1/1 (v/v); temperature = 90° C.

The polymerization results are summarized below.

| Sample No. | time(h) | Conversion | Mn | Mn, th | Mw/Mn |
|---|---|---|---|---|---|
| PTH55-1 | 1.0000 | 0.19682 | 4040.0 | 5904.6 | 1.3100 |
| PTH55-2 | 3.5000 | 0.32559 | 7900.9 | 9767.7 | 1.3400 |
| PTH55-3 | 5.0000 | 0.039782 | 8264.9 | 11934.6 | 1.4600 |
| PTH55-4 | 10.000 | 0.56707 | 11783 | 17012.1 | 1.4900 |
| PTH55-5 | 29.000 | 0.69997 | 16747 | 20999.1 | 1.5800 |

The control over the polymerization was not bad. There was a linear increase of molecular weight with relative good agreement with the theoretical value. The MWD was ~1.4. However, a very slow increase of conversion was observed. The kinetic plots for the polymerization with original, 1$^{st}$ regenerated and 2$^{nd}$ regenerated catalyst show that the activity of the immobilized catalyst decrease for every regeneration steps. Probably, the regeneration reaction is not enough, which led to the accumulation of Cu(II) in the immobilized catalyst. Otherwise, it is also likely that the chloromethyl group initiated the polymerization of MMA and forms the PMMA polymer coating around the particle, which hinders the approach of the chemicals to the active catalyst, reduces the activity, consumes the monomer (lower molecular weight than the theoretical value) and makes the control worse (MWD ~1.4). This can also results in the reduction of the content of Cu and ligand per g of catalyst as discussed above.

Example 11

Polymerization of Styrene with bpy-CuBr Supported on PS bead(8 μm) Using Me6TREN-CuBr2 as Soluble Deactivator—1 mol % of Me6TREN-CuBr2 -PTH28

11a. PS bead-bpy-CuBr/Me6TREN-CuBr2 Hybrid Catalyst was Tested for Styrene Polymerization with 1 mol % of Me6TREN-CuBr2 to bpy-CuBr. First a Stock Solution of Me$_6$TREN-CuBr2 was Prepared in Acetone.

[styrene]:[2-bromopropionitrile]:[bpy-CuBr]:[Me$_6$TREN-CuBr2]=300:1:1:0.01.

Run No. PTH28

| Chemical | g | Ml | mol | mol/L |
|---|---|---|---|---|
| PS-bpy-CuBr | 0.149 | | 1.7135e−4 | 1.41e−2 |
| styrene | 5.35 | 5.89 | 5.14e−2 | 4.23 |
| Me6TREN-CuBr2 (from stock sol'n) | | | 1.7135e−6 | 1.41e−4 |
| Acetone | | 0.56 | | |
| chlorobenzene | | 5.69 | | |
| 2-bromo-propionitrile | 2.30e−2 | 14.8e−3 | 1.7135e−4 | 1.7135e−2 |

Polymerization condition: Monomer = styrene [sty]$_0$:[I]$_0$:[PS-bpy-CuBr]$_0$:[Me$_6$TREN-CuBr$_2$]$_0$ = 300:1:1:0.01, Me$_6$TREN-CuBr$_2$ from stock solution in acetone [sty]$_0$ = 4.23 mol/L; styrene/chlorobenzene/acetone = 1/0.97/0.10 v/v/v; temperature = 120° C.

The conversion curve showed a curvature but the molecular weight increased linearly up to 60% of conversion with very good agreement with the theoretical molecular weight. The molecular weight distribution was very narrow (~1.1). The GPC curves showed very clear shift to higher molecular weight region with conversion up to 60% suggesting very good control over polymerization.

The polymerization results are summarized below.

| Sample No. | time(h) | Conversion | Mn | Mn(th) | Mw/Mn |
|---|---|---|---|---|---|
| PTH28-1 | 0.50000 | 0.12538 | 4041.0 | 3917.0 | 1.2940 |
| PTH28-2 | 2.0000 | 0.28127 | 11000 | 8788.0 | 1.1970 |
| PTH28-3 | 4.0000 | 0.40469 | 15760 | 12644 | 1.1750 |
| PTH28-4 | 8.0000 | 0.52732 | 20580 | 16476 | 1.1800 |
| PTH28-5 | 19.000 | 0.67652 | — | — | — |
| PTH28-6 | 26.000 | 0.71605 | — | — | — |
| PTH28-7 | 47.000 | 0.79543 | — | — | — |

Example 12

Cu Leaching Test from PS(8 μm)-bpy-CuBr Catalyst—MMA Polymerization Experiment and the Analysis of Residual Cu in the PMMA Obtained—PTH49

As part of the effort to clarify whether leaching of Cu from immobilized catalyst is significant or not (using a UV-vis test it was concluded that the leaching was negligible), the MMA polymerization was attempted using PS(8 μm)-bpy-CuBr immobilized catalyst only.

Experiment PTH49

| Chemical | g | mL | mol | mol/L |
|---|---|---|---|---|
| PS(8 μm)-bpy-CuBr | 0.087 | | 6.46e−5 | |
| MMA | 1.94 | 2.07 | 1.94e−2 | |
| Toluene | | 1.87 | | |
| 2-bromopropionitrile | 8.67e−3 | 5.58e−3 | 6.46e−5 | |
| Anisole | | 0.2 | | |

Polymerization condition: Monomer = MMA $[MMA]_0:[I]_0:[PS\text{-}bpy\text{-}CuBr]_0$ = 300:1:1, $[MMA]_0$ = 4.45 mol/L; MMA/solvent (toluene + anisole) = 1/1 (v/v); temperature = 90° C.

The polymer solution obtained in the reaction was diluted with 20 mL of THF and cast onto a glass plate to allow the the solvents to evaporate, which afforded a transparent PMMA film. The film was analyzed for residual Cu content. The residual amount of Cu was <1 ppm (Analysis by ICP, from Chemisar Laboratories, Inc.) This result implies that the amount of leaching of the Cu catalyst during the polymerization is almost negligible. Thus, the reduction of Cu and ligand content seen in the catalyst after attempts at regeneration could be attributed to the gradual catalyst lost during the extensive washing steps. The reduction of Cu and ligand also suggest that probably the catalyst is not homogeneously distributed in the catalyst particle. It is possible that the Cu catalyst species are distributed mainly in the surface layer of the catalyst particle and removed gradually by the peeling of the surface layer of the particle during the extensive laboratory washing steps because the particle is basically mechanically not so tough.

Example 13

Cu Leaching Test from PS(8 μm)-bpy-CuBr Catalyst with Toluene/MMA Under Stirring or Without Stirring—UV-visible Investigation Because of the slightly higher value of residual Cu content in the final polymer (15 ppm compared to 6 ppm theoretical value, although this is almost negligible difference), and loss of Cu during the regeneration procedures (11% Cu loss), a leaching test was performed in toluene/MMA solvent (polymerization medium) to check whether a simple leaching could be happening in the polymerization step or not.

Experiment 1.

| | | | |
|---|---|---|---|
| PS(8 μm)-bpy-CuBr catalyst | 0.145 g | | 1.0769e−4 mol Cu |
| Degassed MMA (MMA:CuBr = 300:1) | 3.230 g | 3.46 mL | 3.23e−2 mol |
| Degassed Tol MMA/tol = 1/1 (v/v) | | 3.46 mL | |

The slurry of the catalyst supported particles were stored under nitrogen for a week (no stirring) and a 5.5 mL sample of the clear supernatant solution was transferred to a schelnk tube under nitrogen. UV-vis was performend under nitrogen. No distinct peak was observed. To confirm the result, the solution was vacuum dried and tested again with bis(cyclohexanone)oxaldihydrazone to form a complex with Cu(II) in alcohol(or water) and give strong blue color. The solution was vacuum dried and ethanol/water (10/2) and bis(cyclohexanone)oxaldihydrazone was under air. The UV-vis spectrua were taken for this sample with standard solutions. While a complex signals was observed at 190~350 nm due to ligand and colorant (bis(cyclohexanone)oxaldihydrazone). No distinct signal was observed above 400 nm.

Experiment 2.

2.75 mL of MMA and 2.75 mL of toluene were added Into residual catalyst in experiment 1. The catalyst solution was stirred for overnight (24 h) then the catalyst was allowed to form a sediment to obtain the clear supernatant solution. The solution was checked with UV-vis. Still no distinct signal was observed.

From these experiments, it seems that there is no distinct leaching of Cu occurring during the polymerization.

Example 14

PS(8 μm)-bpy-CuBr Catalyst Particle Morphology: Original and After the Regeneration—Optical Microscope Observation One question raised in the above discussion is whether the catalyst particle can retain its original shape during the catalyst preparation and regeneration steps, the catalyst particle morphology of the original one (PS(8 μm)-bpy-CuBr catalyst particle) and the regenerated one were observed by optical microscope. The original catalyst particle (left) exhibited discrete spherical morphology. The size of the catalyst was approximately 5~10 μm, which agreed well with the reported data (Aldrich, 8 μm, 5% crosslinked) from the supplier.

The regenerated particle also exhibited the same discrete spherical morphology, which is not so different from the original catalyst particle. This observation means that the 8 μm size PS bead particles endure well the shear stresses that were applied during the whole washing and regeneration steps. However, it is not obvious from this picture whether the surface layer of the particle was peeled off accounting for the loss of the catalyst species (Cu and ligand) or not.

Example 15

MMA Polymerization with PS(8 μm)-bpy-CuBr/$Me_6TREN$-$CuBr_2$ Hybrid Catalyst: DP=100

This example was run to check the control over the polymerization behavior when a lower DP was targeted.

Experiment PTH52

| Chemical | g | mL | mol | mol/L |
|---|---|---|---|---|
| PS(8 μm)-bpy-CuBr | 0.084 | | 6.24e−5 | |
| MMA | 0.625 | 0.67 | 6.24e−3 | |
| toluene | | 0.57 | | |
| Acetone | | 0.26 | | |
| Me6TREN-CuBr2 | | | 6.24e−7 | |
| 2-bromopropionitrile | 8.36e−3 | 5.40e−3 | 6.24e−5 | |
| Anisole | | 0.1 | | |

Polymerization condition: Monomer = MMA $[MMA]_0:[I]_0:[PS\text{-}bpy\text{-}CuBr]_0:[Me_6TREN\text{-}CuBr_2]_0$ = 100:1:1:0.01, $Me_6TREN$-$CuBr_2$ from stock solution in acetone (CuBr2 = 2.38e−5 mol, Me6TREN = 2.38e−5 mol, acetone 10 mL), $[MMA]_0$ = 3.9 mol/L; MMA/solvent (toluene + anisole) = 1/1 (v/v); temperature = 90° C.

The polymerization was much faster than when a DP 300 was targeted (t~20 h). The polymerization was finished in 6 h (~3 times faster than DP 300). The control over the polymerization was still retained.

The polymerization results are summarized below.

| Sample No. | time(h) | Conversion | Mn | Mn, th | Mw/Mn |
|---|---|---|---|---|---|
| PTH52-1 | 1.0000 | 0.62378 | 6749.2 | 6245.0 | 1.3600 |
| PTH52-2 | 2.0000 | 0.78212 | 9001.7 | 7830.0 | 1.3000 |
| PTH52-3 | 3.0000 | 0.83362 | 10693 | 8346.0 | 1.2900 |
| PTH52-4 | 5.5000 | 0.91621 | 11999 | 9173.0 | 1.3200 |

Example 16

Large Bead Supported Catalyst/soluble Catalyst (Me$_6$TREN) hybrid Catalyst System 16a. Preparation of PS(50 μm)-bpy-CuBr Catalyst In certain industrial equipment it could be advantageous to use larger particle beads to assist in the macro-flow of the liquid over the solid. The catalyst system, CuBr with bpy ligand was therefore immobilized on a commercial polystyrene bead which has a bigger bead size (50 μm).

Reactants:

| | | |
|---|---|---|
| PS bead-Cl (Aldrich Merrifield resin) | 5.023 g | 1.0197e−2 mol Cl |
| DMbpy | 7.2430 g | 3.9312e−2 mol |
| (IPr)$_2$NH | 5.51 mL | 3.9312e−2 mol |
| nBuLi | 15.72 mL | 3.9312e−2 mol |
| THF | 130 mL | |

The resin was added to a three neck 250 mL round botton flask which was deoxygenated by charging with N2 follow by vacuum, then 50 mL of dry THF and 7.8 mL of (iPr)2NH were added while the flask was immersed in a dryice/acetone bath. 15.72 mL of n-BuLi was slowly added to this mixture and the resulting mixture was further stirred at −78° C. for 2 h. A solution of dMbpy pre-dissolved in 80 mL of fresh THF at 60° C. was introduced dropwise and the reaction stirred at −78° C. for an additional 2 h. The reaction temperature was slowly increased to room temperature and stirred for additional 14 h. The resulting product was thoroughly washed two times with toluene, five time THF and with MeOH three times. Drying under vacuum gave yellow powder of the polystyrene bead with attached ligand.

16b. Metallation with CuBr

Reactants:

| | | |
|---|---|---|
| PS bead-bpy | 1.5248 g | 3.0953e−3 mol bpy ligand on PS |
| CuBr | 0.444 g | 3.0953e−3 mol |
| Dry THF | 60 mL | |

Into 100 mL schlenk flask were introduced 1.5248 g of PSbead(50 μm)-bpy and 0.444 g of CuBr followed by evacuation with high vacuum and refilled with dehydrated nitrogen for three times. After 60 mL of THF was added to the flask to suspend it, the temperature was increased to 70° C. The reaction mixture was stirred at that temperature for 19 h. The obtained product was washed thoroughly with 60 mL of THF for three times and hexane for two times by decantation. The catalyst was dried under vacuum to obtain black/brown powder and stored under dry nitrogen.

Example 17

Polymerization of MMA Using PS(50 μm)-bispicolylamine-CuBr Catalyst with 1 mol % of Me6TREN-CuBr2 as Soluble Deactivator—PTH48 (Repeat of PTH29 to Confirm the Result)

PS(50 μm)-bispicolylamine-CuBr catalyst was tested for MMA polymerization. This is the repeat of PTH29 to confirm the result.

Experiment PTH48

| Chemical | g | mL | mol | mol/L |
|---|---|---|---|---|
| PS(50 μm)-bispi-colylamine–CuBr | 0.086 | | 6.415e−5 | |
| MMA | 1.927 | 2.06 | 1.924e−2 | |
| toluene | | 1.86 | | |
| 2-bromopropionitrile | 8.59e−3 | 5.55e−3 | 6.415e−5 | |
| Me6TREN-CuBr2 (from stock sol'n) | | | 6.4156−7 | |
| Acetone | | 0.3 | | |
| Anisole | | 0.2 | | |

Polymerization condition: Monomer = MMA [MMA]$_0$:[I]$_0$:[PS-bpy-CuBr]$_0$:[Me$_6$TREN-CuBr$_2$]$_0$ = 300:1:1:0.01, Me$_6$TREN-CuBr$_2$ from stock solution in acetone (CuBr2 = 2.38e−5 mol, Me$_6$TREN = 2.38e−5 mol, acetone 10 mL), [MMA]$_0$ = 4.45 mol/L; MMA/solvent (toluene + anisole) = 1/1 (v/v); temperature = 90° C.

The polymerization results are summarized below.

| Sample No. | time(h) | Conversion | Mn | Mn, th | Mw/Mn |
|---|---|---|---|---|---|
| PTH48-1 | 2.0000 | 0.53379 | 19500 | 16036 | 1.4270 |
| PTH48-2 | 5.0000 | 0.69236 | 30400 | 20799 | 1.3640 |
| PTH48-3 | 16.500 | 0.90568 | 42770 | 27208 | 1.4320 |

Control over the polymerization was still not as good as when PS (8 μm)-bpy-CuBr was used as the supported catalyst. The molecular weight was different from the theoretical value and the MWD ~1.4. However, the system was controlled. Hybrid catalyst systems based on adsorption/desorption of the transition metal complex through hydrogen bonding of the ligand to the added solid.

Example 17

CN$_6$TREN was Chosen as a First Exemplary Ligand Since this Ligand Would be Strongly Adsorbed onto a Polar Substrate such as a Silica Particle.

17a. Preparation of CN$_6$TREN

The reaction scheme for the preparation of the hexa-substituted triamine ligand is shown in scheme 4.

Scheme 4.

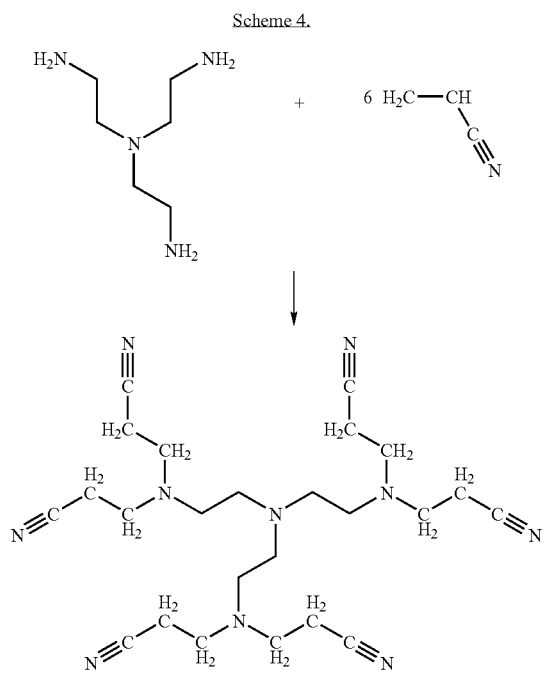

Reaction Conditions

| Chemical | g | mL | mol | mol/L |
|---|---|---|---|---|
| Tris(2-aminoethyl)amine(TREN) | 2.578 | | 1.765e-2 | 0.654 |
| Acrylonitrile | 5.622 | 6.98 | 0.106 | 3.929 |
| Methanol | | 20 | | |

Reaction temperature and time; 0° C. for 15 min, 40° C. for 3 h, 25° C. for 24 h, 70° C. 68 h, successively.

The conversion was followed by GC analysis and was complete after 64 hr. At the end of the reaction period the reaction liquid was subjected to high vacuum to remove all possible volatile species. A yellow viscous liquid was obtained. To check the chemical structure of the compound, Mass Spectroscopy and NMR were performed. $CN_6TREN$ has a MW=464.25 and a molecular peak at 465.4 (M+H$^+$) was observed from mass spectroscopy, which suggest the formation of $CN_6TREN$. $^1$H-NMR spectrum was also consistent with the formation of $CN_6TREN$.

17b. Polymerization of MMA with "Free" $CN_6TREN$

Run No. 17b

| Chemical | mg | mL | mol | mol/L |
|---|---|---|---|---|
| CN6TREN | 66.9 | | 1.44e-4 | 1.56e-2 |
| CuBr | 20.7 | | 1.44e-4 | 1.56e-2 |
| MMA | | 4.62 | 4.32e-2 | 4.67 |
| 2-bromopropionitrile | | 12.3e-3 | 1.44e-4 | 1.56e-2 |
| Toluene | | 4.62 | | |

Reaction condition: temperature, 90° C.; time, 16 h, [MMA]:[2-bromopropionitrile]:[CN$_6$TREN-CuBr] = 300:1:1.

The molecular weight increased with conversion and molecular weight distribution was narrow; MWD (~1.3), indicating that a transition metal catalyst complexed with $CN_6TREN$ worked well in ATRP of MMA.

17c. Polymerization of MMA with $CN_6TREN$ in the Presence of Silica

Run No. 17c

| Chemical | mg | mL | mol | mol/L |
|---|---|---|---|---|
| CN6TREN | 66.9 | | 1.44e-4 | 1.56e-2 |
| CuBr | 20.7 | | 1.44e-4 | 1.56e-2 |
| MMA | | 4.62 | 4.32e-2 | 4.67 |
| 2-bromopropionitrile | | 12.3e-3 | 1.44e-4 | 1.56e-2 |
| Silica | 1.27e3 | | | |
| Toluene | | 4.62 | | |

Reaction condition: temperature, 90° C.; time, 16 h, [MMA]:[2-bromopropionitrile]:[CN$_6$TREN-CuBr] = 300:1:1, silica was dried under vacuum at 130° C. for 6 h prior to use.

Conversion of MMA to PMMA reached 55% in 16 h. However, the Mw/Mn was fairly high (1.93). Therefore in contrast to the previous experiment example (Run No. 17b), a transition metal complex with $CN_6TREN$ as ligand did not work well in the presence of silica (MWD ~2) as in homogeneous solution. This indicates that the complex was strongly absorbed onto the silica surface and as with the ligand supported catalyst the redox conjugate of the transition metal catalyst was not readily accessible to the growing active polymer chain.

Example 18

Evaluation of Bispicolyl Amine Ligands with Ureido-4-pyrimidinone Group

The initial experiments concentrated on the evaluation of bispicolyl amine ligands with ureido-4-pyrimidinone group in the ATRP of styrene and methyl acrylate.

18a. Bispicolyl amine (BPOMA) and bispicolyl amine with ureido-4-pyrimidinone moiety (BPUMA) were tested as a ligand for the atom transfer radical polymerization (ATRP) of styrene and methyl acrylate and the results are shown in the table below.

TABLE 18

Atom transfer radical polymerization of styrene and methyl acrylate using "free" BPOMA and BPUMA ligands

| Monomer | Ligand | Temp (° C.) | Time (h) | Conv (%) | Mn, sec | Mn, th | Mw/Mn |
|---|---|---|---|---|---|---|---|
| St | BPOMA | 110 | 7.2 | 59 | 11580 | 11800 | 1.14 |
| MA | BPOMA | 50 | 14.0 | 69 | 16250 | 13850 | 1.25 |
| St | BPUMA | 110 | 5.2 | 57 | 12700 | 11400 | 1.22 |
| MA | BPUMA | 50 | 28.7 | 52 | 12220 | 10400 | 1.26 |
| MMAa | BPOMA | 50 | 3.1 | 22 | 7320 | 4400 | 1.45 |
| MMAa | BUPMA | 50 | 5.6 | 58 | 16800 | 11600 | 1.47 |

Reaction conditions:
For styrene, [Styrene] = 4.3 M, anisole/styrene = 1/1 (v/v),
[Styrene]:[PEBr]:[CuBr]:[Ligand] = 192:1:1:;
For methyl acrylate, [MA] = 5.6 M, anisole/methyl acrylate = 1/1 (v/v),
[MA]:[MBP]:[CuBr]:[Ligand] = 232:1:1:1
BPOMA = N,N-bis(2-pyridylmethyl)octylamine,
BPUMA = N,N-bis(2-pyridylmethyl)octylamine ligand with ureido-4-pyrimidinone moiety
a[MMA] = 4.6 M, [MMA]/[EtBriBu] = 200,, anisole/methyl methacrylate [EtBriBu]/[CuX]/[Ligand] = 2/1/1

Good control over the styrene and methyl acrylate polymerization was observed with both ligands. As shown in the table polymers with low polydispersity ($M_w/M_n$=~1.2) with predictable molecular weight ($M_{n,sec}$~$M_{n,th}$) were obtained at the conversion of around 60%. An examination of the semilogarithmic kinetic plot and the variation of molecular weight with conversion in both the styrene and methyl acrylate polymerizations showed linear semilogarithmic kinetic plot and a linear increases of molecular weight with a good agreement with the theoretical values, confirming the good control over the polymerization with BPUMA ligand. However when compared to BPOMA, the control of polymerization is not quite as good when BPUMA is used. This can partially attributed to the fact that the complex formed between CuBr and BUPMA does not completely dissolve in the non-polar/weak polar medium, thus making the deactivation process is not as efficient as when the CuBr/BPOMA complex is used as the catalyst. Therefore the polymers obtained by using CuBr/BPUMA have boarder molecular weight distributions. Two approaches were taken to increase the solubility of the CuX/BUPMA complex. The first was use of a solvent such as DMF, (50% v/v with monomer), for the polymerization of methyl acrylate using BUPMA as the ligand. The system become a homogenous solution at 50 C, when such a large amount of solvent is used, and conversion reached 54% conversion after 24 hours; molecular weight 9860, PDI 1.48.

The other approach was to increase the reaction temperature. The polymerization was conducted at 70 C with the same ratio of reactants and although the solubility of the complex increased it is still not an homogenous solution. The polymerization reach 68% conversion at 3.6 hours, molecular weight 14830, PDI 1.25.

Overall, the BPUMA was confirmed to be a good ligand for ATRP.

Ligand Attached to Inorganic Supports.

Example 19

Silica Supported Diamine Ligand

19a. Synthesis of N,N,N'-trimethyl-N'[3-(trimethoxysilylporpoxycarbonyl)ethyl]-ethylenediamine

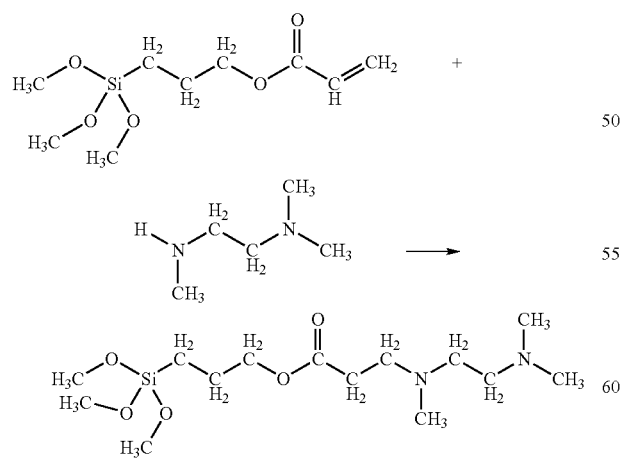

Diamine ligand for ATRP catalyst with trimethoxy silyl group for the immobilization on silica was synthesized through Micheal addition reaction of amine.

Reaction Recipe

| Chemical | g | mL | mol |
|---|---|---|---|
| 3-(trimethoxysilylpropyl)acrylate | 10 | 9.48 | 4.27e−2 |
| N,N,N'-trimethylethylenediamine | 5.24 | 6.66 | 5.13e−2 (1.2 times excess) |

Reaction condition: temperature, 25° C.; time, 47 h.

Procedure: Into a three neck flask equipped with a dropping funnel and charged with $N_2$ was added 10 g of 3-(triemthoxysilylpropyl)acrylate at 0° C. N,N,N'-trimethylethylenediamine was introduced into the reactor dropwise for 1 h. The reaction mixture was stirred further at 0° C. and the temperature was increased to room temperature. The conversion of the reaction was checked by the disappearance of acrylate peak around 6 ppm in $^1$H-NMR analysis. The reaction was completed in 47 h. The high vacuum was applied to the reaction mixture to remove unreacted excess N,N,N'-trimethylethylenediamine. The $^1$H-NMR spectrum of the compound showed. $^1$H-NMR (CDCl$_3$) δ: 3.90 ppm (t, 2H, COOCH$_2$); 3.40 ppm (s, 9H, SiOCH$_3$); 2.60 ppm (t, 2H, CH$_2$COO); 2.35 ppm (m, 4H, CH$_2$N); 2.25 ppm (t, 2H, NCH$_2$CH$_2$COO); 2.10 ppm (s, 9H, NCH$_3$); 1.60 ppm (m, 2H, SiCH$_2$CH$_2$); 0.50 ppm (t, 2H, SiCH$_2$) which is consistent with the desired structure.

19b. Preparation of Silica Supported Trimethyldiamine—CuBr Catalyst

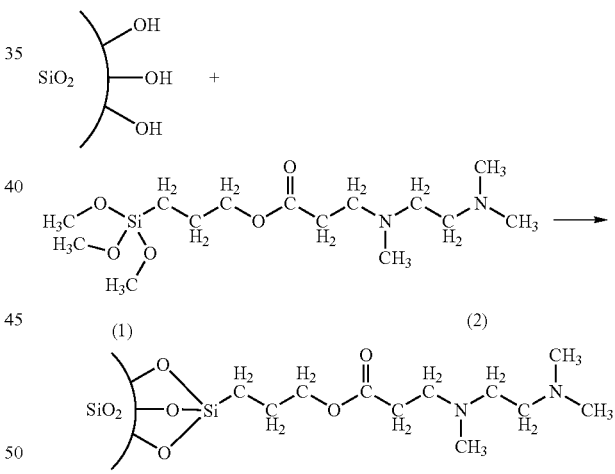

The silica supported trimethylethylene diamine was prepared through the reaction scheme 5.

Reaction Recipe

| Chemical | g | mL | mol |
|---|---|---|---|
| Silica[a] (1) | 3.87 | | |
| Diamine ligand (2) | 1.95 | | 5.795e−3 |
| Dry THF | | 30 | |

Reaction condition: temperature, 70° C.; time, 42 h.
[a]Silica was dried at 135° C. under vacuum for 72 h prior to use.

Procedure: Into a 250 mL three-neck flask charged with $N_2$ was added 3.87 g of silica under nitrogen. 1.95 g of diamine ligand (2) was weighed separately and add to the reaction flask with 30 mL of dry THF. The reaction was performed at 70° C. for 42 h. After the reaction, a high vacuum was applied to the reaction flask to remove THF and washed with 40 mL of dry, degassed THF for 4 times through decantation method.

19c Preparation of Silica Supported Trimethylethylene Diamine-CuBr Catalyst—SDC-112900

The prepared silica supported ligand was metallated with CuBr.

Reaction Recipe

| Chemical | g | mL | mol |
|---|---|---|---|
| Silica supported diamine ligand | 2.322 | | 2.312e−3 (assuming 100% yield in previous rxn) |
| CuBr | 0.3318 | | 2.312e−3 |
| Dry THF | | 30 | |

Reaction condition: temperature, 60° C.; time, 18 h.

Procedure: Into a 250 mL three-neck flask charged with $N_2$ was added 2.322 g of silica-supported ligand under nitrogen. 0.3318 g of CuBr was weighed separately and add to the reaction flask followed by the vacuum and $N_2$ for 3 times. Degassed, dry THF was introduced to the reaction mixture to suspend the silica and the reaction was performed at 60° C. 18 h. After the reaction, a high vacuum was applied to the reaction flask to remove THF and washed with 40 mL of dry, degassed THF for 4 times through decantation method. Finally, the reaction product was obtained through evaporation of THF. A blue powder was obtained.

Example 20

Polymerization of MMA, MA and Styrene with of Silica Supported Trimethylethylenediamine-CuBr Catalyst 20a. Polymerization of MMA—SDA2

Silica supported trimethylethylenediamine-CuBr catalyst was tested for MMA polymerization.

Run No. SDA2

| Chemical | g | mL | mol | mol/L |
|---|---|---|---|---|
| SDC-112900 | 0.2338 | | 1.62e−4 | 1.56e−2 |
| MMA | 4.85 | 5.18 | 4.847e−2 | 4.69 |
| Toluene | | 5.18 | | |
| 2-bromopropionitrile | 2.16e−2 | 14.0e−3 | 1.62e−4 | 1.56e−2 |

Reaction conditions: temperature, 90° C.; time, 20 h, [MMA]:[2-bromopropionitrile]:[dimethylethylenetriamine–CuBr on silica] = 300:1:1

GPC curves did not show a clean shift of curves with conversion and indicate the immobilized catalyst alone can't control the polymerization.

20b. Polymerization of MA—SDA3

Silica supported trimethylethylenediamine-CuBr catalyst was tested for MA polymerization Run No. SDA3

| Chemical | g | mL | mol | mol/L |
|---|---|---|---|---|
| SDC-112900 | 0.3183 | | 2.20e−4 | 1.85e−2 |
| MA | 5.68 | 5.94 | 6.6e−2 | 5.6 |
| Toluene | | 4.94 | | |
| Anisole | | 1 | | |
| 2-bromopropionitrile | 2.95e−2 | 19.0e−3 | 2.20e−4 | 1.85e−2 |

Reaction conditions: temperature, 70° C.; time, 50 h, [MA]:[2-bromopropionitrile]:[dimethylethylenetriamine–CuBr on silica] = 300:1:1

The first order kinetic plot exhibited linear increase of conversion. However, the molecular weight distribution was broad (~2.0) and showed no increase in the molecular weight. GPC curves showed no shift with conversion and indicate the immobilized catalyst alone can't control the polymerization of MA.

20c. Polymerization of Styrene—SDA4

Silica supported trimethylethylenediamine-CuBr catalyst was tested for styrene polymerization Run No. SDA4

| Chemical | g | mL | mol | mol/L |
|---|---|---|---|---|
| SDC-112900 | 0.361 | | 2.49e−4 | 1.45e−2 |
| Styrene | 7.79 | 8.57 | 7.48e−2 | 4.36 |
| Chlorobenzene | | 7.57 | | |
| Anisole | | 1 | | |
| PEBr | 4.6e−2 | 34.0e−3 | 2.49e−4 | 1.45e− |

Reaction conditions: temperature, 110° C.; time, 25 h, [styrene]:[PEBr]:[dimethylethylenetriamine–CuBr on silica] = 300:1:1

The first order kinetic plot exhibited linear increase of conversion. However, the molecular weight distribution was broad (>2.0) and showed no increase in the molecular weight. GPC curves are shown below and showed no distinct shift with conversion and indicate the immobilized catalyst alone can't control the polymerization.

20d. Polymerization of MMA with Silica Supported Trimethylethylenediamine-CuBr Catalyst Using Me6TREN-CuBr2 as Soluble Deactivator—1 mol % of Me6TREN-CuBr2—PTH30

Silica supported trimethylethylenediamine-CuBr catalyst was tested for MMA polymerization with 1 mol % of Me6TREN-CuBr2 as a soluble deactivator to trimethylethylenediamine-CuBr. Please compare this result with DA2 experiment in this monthly report. You will find a clear improvement on the control over the polymerization with hybrid catalyst system.

Run No. PTH30

| Chemical | g | mL | mol | mol/L |
|---|---|---|---|---|
| SDC-112900 | 0.2366 | | 1.635e−4 | 1.563e−2 |
| MMA | 4.91 | 5.25 | 4.905e−2 | 4.69 |
| Me6TREN-CuBr2 (from stock sol'n) | | | 1.635e−6 | 1.563e−4 |
| Acetone | | 0.55 | | |

-continued

| Chemical | g | mL | mol | mol/L |
|---|---|---|---|---|
| Toluene | | 4.71 | | |
| 2-bromo-propionitrile | 2.19e−2 | 14.1e−3 | 1.635e−4 | 1.563e−2 |

Reaction conditions: temperature, 90° C.; time, 20 h, [MMA]:[2 bromopropionitrile]:[dimethylethylenetriamine−CuBr on silica]:[Me6TREN-CuBr2] = 300:1:1:0.01; Me6TREN-CuBr2 stock solution in acetone (CuBr2 = 4.5e−5 mol, Me6TREN = 4.5e−5 mol, acetone 15 mL The first order kinetic plot exhibited linear increase of conversion. The molecular weight distribution was narrow (~1.3) and showed linear increase of molecular weight. The number average molecular weight was almost identical with the theoretical one. GPC curves show a clean shift with conversion.

These results indicate the hybrid catalyst system is applicable to the other immobilized system such as trimethylethylenediamine which is supported on silica.

The polymerization results are summarized below.

| Sample No. | time(h) | Conversion | Mn | Mw/Mn |
|---|---|---|---|---|
| PTH30-1 | 1.0000 | 0.16899 | 11250 | 1.8120 |
| PTH30-2 | 3.0000 | 0.65799 | 24110 | 1.3150 |
| PTH30-3 | 5.0000 | 0.80539 | 32820 | 1.2700 |
| PTH30-4 | 9.0000 | 0.93385 | 37000 | 1.2900 |
| PTH30-5 | 20.000 | 0.96643 | — | — |

The invention claimed is:

1. A process for the removal and recycle of a supported transition metal catalyst complex from a polymerization reaction medium comprising the steps:
    separating the supported transition metal catalyst from the reaction medium after a polymerization, and
    contacting the supported transition metal catalyst with a reducing agent to regenerate the supported transition metal catalyst.

2. The process of claim 1, wherein the reducing agent comprises at least one of a transition metal and a source of radicals.

3. The process of claim 2, wherein the reducing agent comprises a transition metal in its zero oxidation state.

4. The process of claim 3, wherein the transition metal in its zero oxidation state is copper.

5. The process of claim 4, wherein the copper is added as at least one of a rod, a wire, a mesh, and a powder.

6. The process of claim 1, wherein the reaction medium comprises a solvent.

7. The process of claim 1, further comprising recycling the support metal catalyst.

8. The process of claim 1, wherein the supported transition metal catalyst is attached to at least one of silica, aluminates, clays, and polystyrene beads.

9. The process of claim 1, wherein the separating the supported transition metal catalyst from the reaction medium comprises at least one of filtering and centrifuging the reaction medium.

10. The process of claim 3, further comprising:
    adding free ligand to the reaction medium.

11. The process of claim 1, wherein the reaction medium comprises a solvent.

12. The process of claim 1, further comprising:
    recycling the supported transition metal catalyst.

13. The process of claim 1, further comprising:
    changing the conditions to cause desorption of the supported transition metal catalyst to form an unsupported transition metal catalyst.

14. The process of claim 13, wherein changing the conditions comprises at least one of changing the temperature and the polarity of the reaction medium.

15. A process for the recovery of transition metal catalyst from a reaction medium, comprising:
    changing the conditions of a medium comprising transition metal catalyst attached to a solid support, wherein changing the conditions causes desorption of the transition metal catalyst from solid support.

16. The process of claim 15, wherein changing the conditions comprises at least one of changing the temperature or the polarity of the medium.

17. The process of claim 15, wherein the solid support is at least one of silica, aluminates, clays, and polystyrene beads.

18. The process of claim 15, further comprising contacting the transition metal catalyst with a reducing agent.

19. The process of claim 18, wherein the reducing agent comprises at least one of a transition metal and a source of radicals.

20. The process of claim 19, wherein the reducing agent comprises a transition metal in its zero oxidation state.

21. The process of claim 20, wherein the transition metal in its zero oxidation state is copper.

22. The process of claim 21, wherein the copper is added as at least one of a rod, a wire, a mesh, and a powder.

* * * * *

UNITED STATES PATENT AND TRADEMARK OFFICE
CERTIFICATE OF CORRECTION

PATENT NO. : 7,157,530 B2 Page 1 of 1
APPLICATION NO. : 10/860807
DATED : January 2, 2007
INVENTOR(S) : Krzysztof Matyjaszewski and Sung Chul Hong It is certified that error appears in the above-identified patent and that said Letters Patent is hereby corrected as shown below:

Column 6, Line 13, delete "(co)polymer "(c0)polymerizable" and insert --"(co)polymer" "(co)polymerizable"--

Column 6, Line 15, delete "(co)polymer "(c0)polymerizable" and insert --"(co)polymer" "(co)polymerizable"--

Column 11, Line 33, delete "if" and insert --of--

Column 14, Line 47, delete "though" and insert --through--

Column 16, Line 2, delete ", which"

Column 20, Line 53, delete "(812 mol/mol)" and insert --(8/2 mol/mol)--

Column 24, Line 32, delete "that" and insert --than--

Column 26, Line 64, delete "that" and insert --than--

Column 37, Line 45, delete "five time THF" and insert --five times with THF--

Column 38, Line 25 (in chart) delete "6.4156-7" and insert --6.415e-7--

Signed and Sealed this

Seventeenth Day of February, 2009

JOHN DOLL
*Acting Director of the United States Patent and Trademark Office*